(12) United States Patent
Jaeger

(10) Patent No.: US 7,930,638 B2
(45) Date of Patent: Apr. 19, 2011

(54) SYSTEM AND METHOD FOR CREATING, PLAYING AND MODIFYING SLIDE SHOWS

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 998 days.

(21) Appl. No.: 10/740,784

(22) Filed: Dec. 18, 2003

(65) Prior Publication Data

US 2005/0034077 A1 Feb. 10, 2005

Related U.S. Application Data

(63) Continuation-in-part of application No. 10/635,746, filed on Aug. 5, 2003, now abandoned.

(51) Int. Cl.
*G06F 3/00* (2006.01)
(52) U.S. Cl. ........ 715/731; 715/732; 715/730; 715/717; 715/781; 715/790
(58) Field of Classification Search .................. 715/731, 715/732, 730, 717, 781, 790
See application file for complete search history.

(56) References Cited

U.S. PATENT DOCUMENTS

| 5,917,480 | A | * | 6/1999 | Tafoya et al. | 715/732 |
| 6,452,615 | B1 | * | 9/2002 | Chiu et al. | 715/776 |
| 6,473,096 | B1 | * | 10/2002 | Kobayashi et al. | 715/731 |
| 7,137,077 | B2 | * | 11/2006 | Iwema et al. | 715/863 |

OTHER PUBLICATIONS

Winter, Patty. "Using Microsoft Office 95". Que, pp. 372, 383-386, 393.*
Haddad, Alexandria. "SAMS Teach Yourself Microsoft PowerPoint 2000 in 24 Hours". 1999, SAMS Publishing. pp. 32-34, 45.*

* cited by examiner

*Primary Examiner* — Kieu Vu
*Assistant Examiner* — Michael Roswell

(57) ABSTRACT

A system and method for creating, playing and modifying slide shows utilizes a graphic play area for sequentially displaying slides of slide shows. The graphic play area is configured to automatically add one or more objects placed in the graphic play area when a slide is displayed in the graphic play area such that the graphic objects are appended to that slide. Thus, the system and method allows a user to easily modify a slide show by simply placing one or more graphic objects, such as text, onto a slide currently being displayed in the graphic play area.

32 Claims, 30 Drawing Sheets

Figure 8a
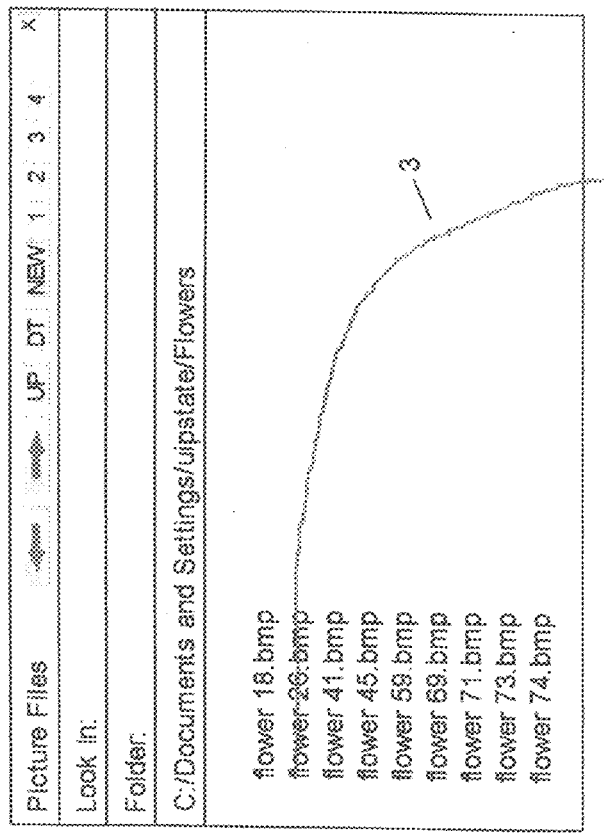
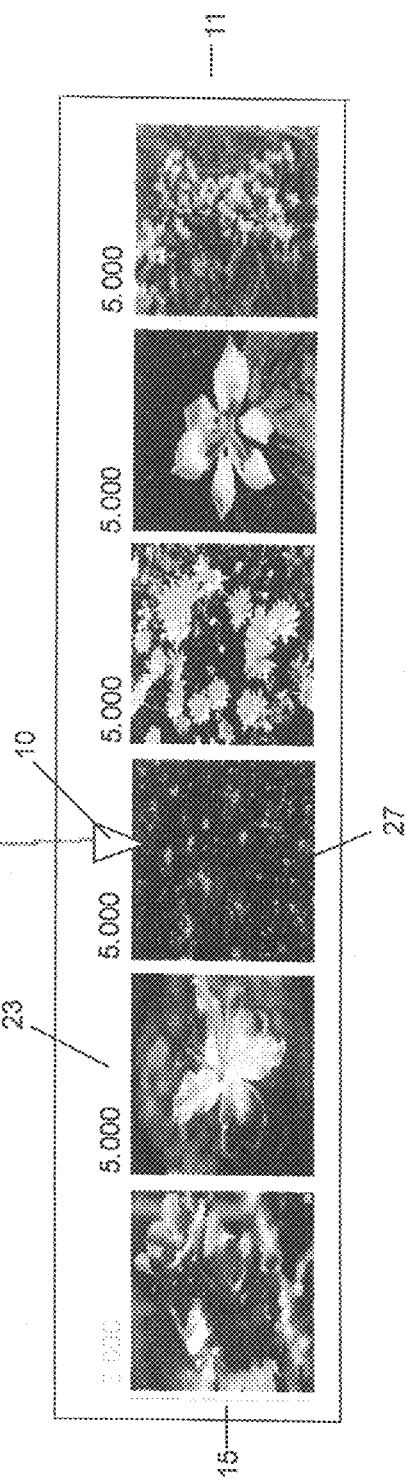

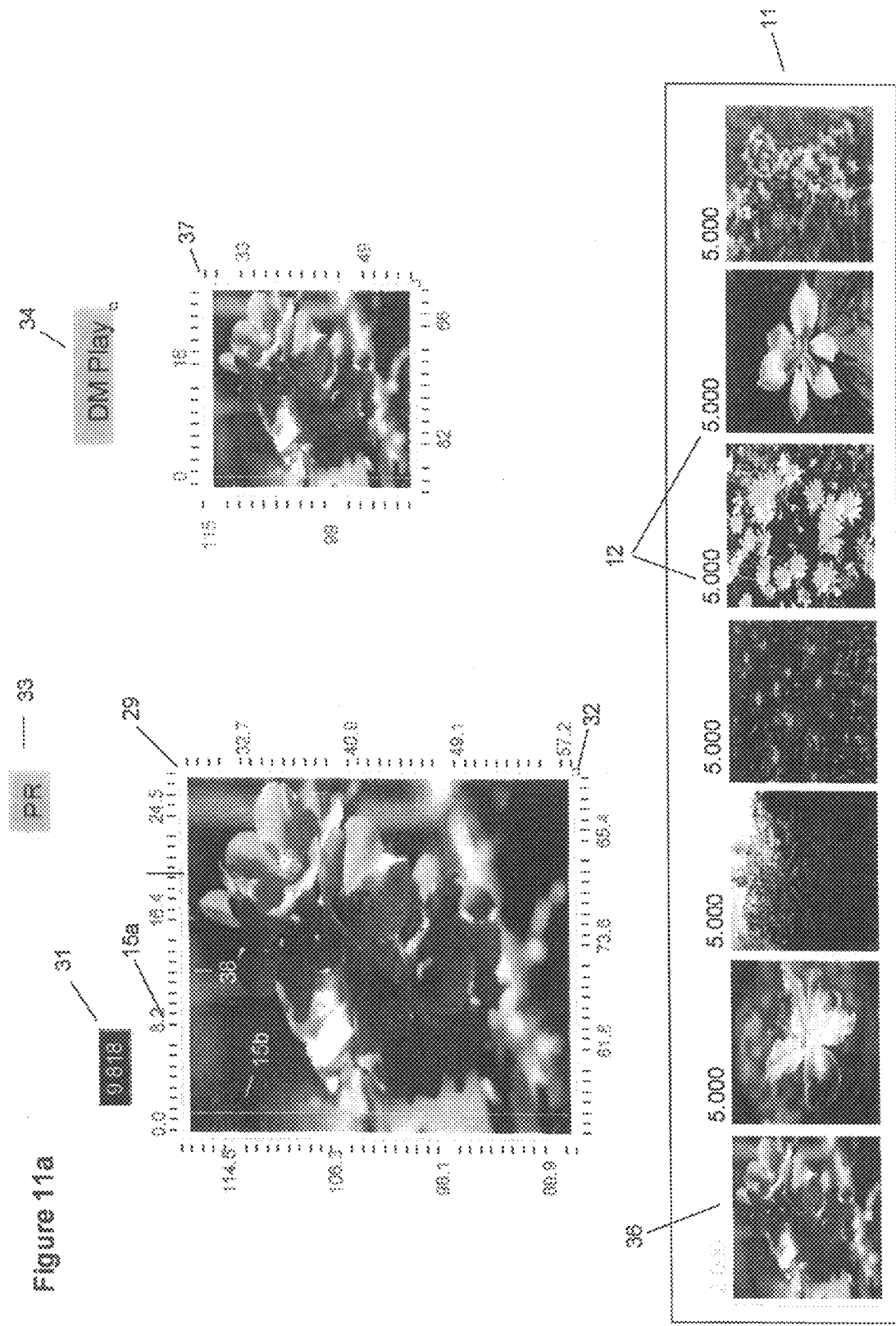

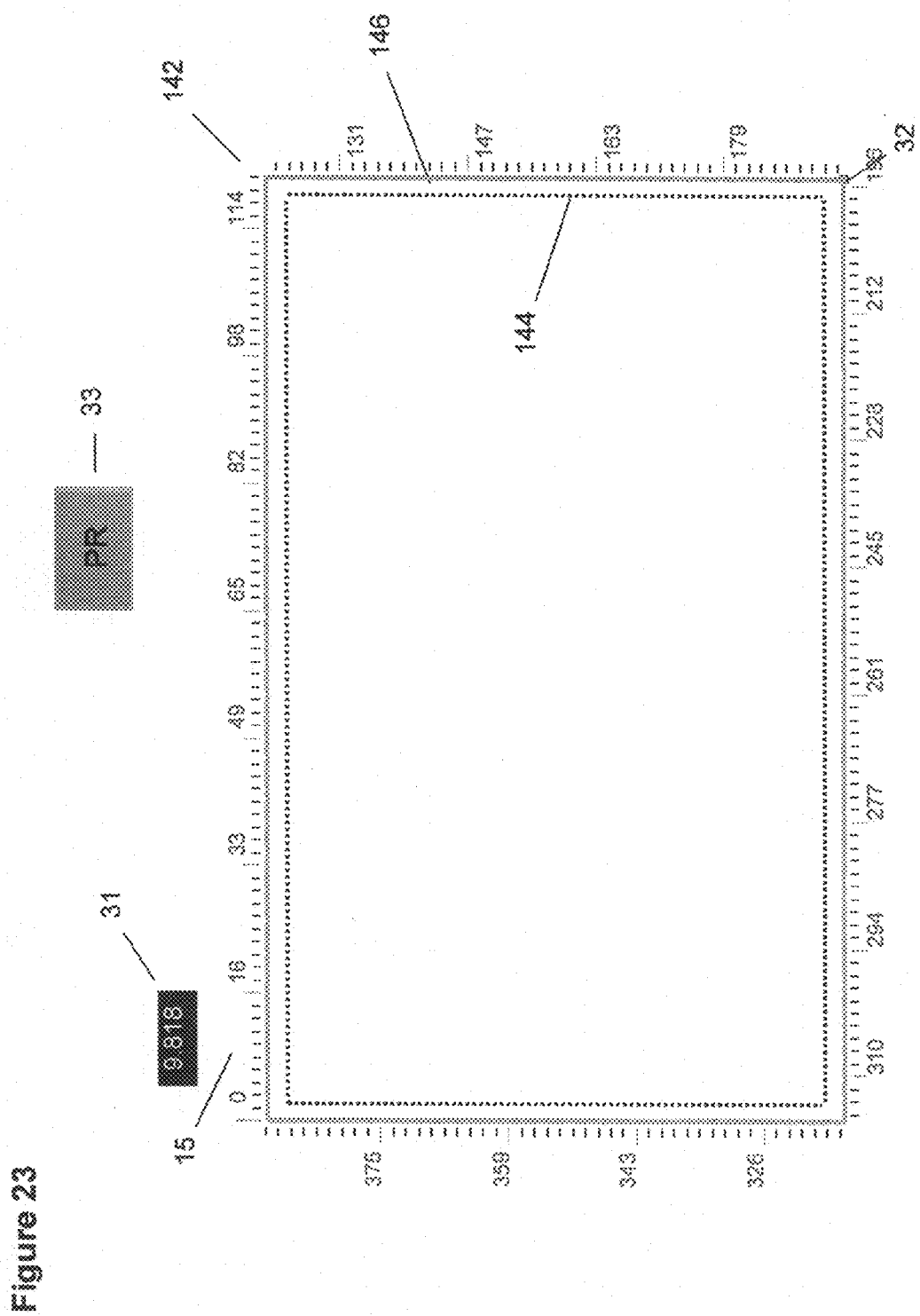

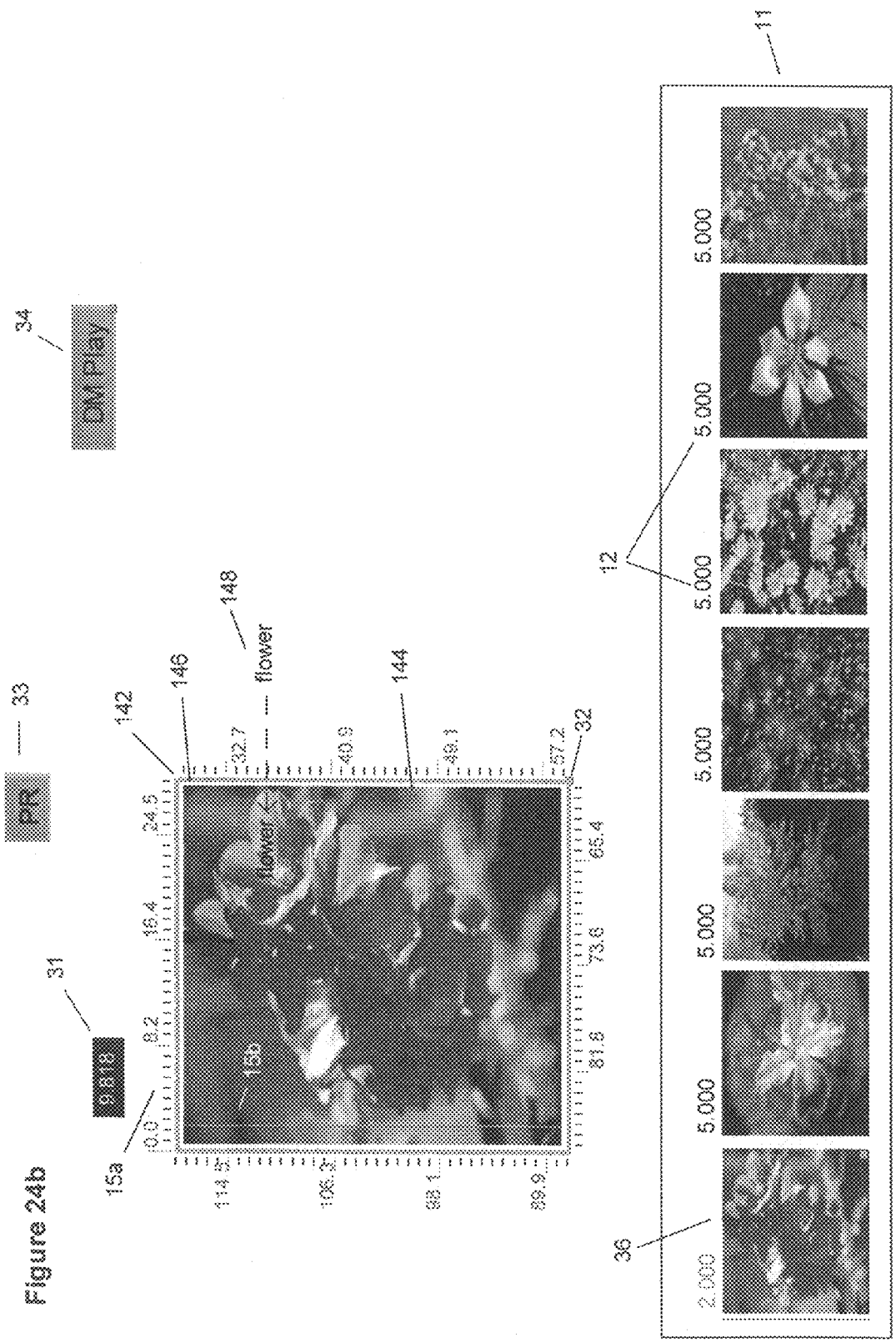

SYSTEM AND METHOD FOR CREATING, PLAYING AND MODIFYING SLIDE SHOWS

CROSS REFERENCE TO RELATED APPLICATION

The present application is a continuation-in-part of U.S. patent application Ser. No. 10/635,746, filed Aug. 5, 2003 now abandoned for which priority is claimed. The entirety of the prior application is incorporated herein by reference.

FIELD OF THE INVENTION

The invention relates generally to computer programs, and more particularly to a system and method for creating, playing and modifying slide shows.

BACKGROUND OF THE INVENTION

Custom electronic slide shows can be created using one of numerous computer programs that are currently available in the consumer marketplace. One type of computer programs of interest that can be used to create slide shows is a photo processing computer program. Using a typical photo processing computer program, a user can create slide shows of digital photos or images by selecting computer image files. The selected image files can then be sequentially displayed by the computer program as a slide show of images.

After the slide show is created, the slide show can be modified by the user. However, modification of the slide show typically involves changing one or more digital images of the slide show by image processing techniques. As an example, if the user desires to insert text into one of the images of the slide show, the desired text must be made part of that image by embedding the text into the image and then saving the image with the embedded text. Thus, the process for modifying a slide show using a photo processing computer program can be a tedious task.

Another type of computer programs of interest that can be used to create slide shows is a presentation computer program. Using a typical presentation computer program in an editing mode, pages of an electronic document or presentation can be created by a user. The pages of the presentations can be used as slides for a slide show. After the pages of the electronic presentation is created, these pages can then be sequentially displayed on the computer screen or a projection screen in the slide show mode of the presentation computer program. Unlike the typical photo processing computer program, the slide show can be modified without having to perform complex image processing techniques. Using the typical presentation computer program, a slide show can be modified by changing one or more pages of the presentation in the editing mode of the program. However, in the slide show mode, the displayed slides or pages of the electronic presentation cannot be modified. Thus, the user needs to get out of the slide show mode and into the editing mode to change any page of the presentation. Thus, the user may need to switch between the editing and slide show modes to modify one or more pages of the presentation and view the effects of the modification.

In view of these disadvantages, there is a need for a system and method for modifying a slide show in a simple manner without having to switch between different modes of operation.

SUMMARY OF THE INVENTION

A system and method for creating, playing and modifying slide shows utilizes a graphic play area for sequentially displaying slides of slide shows. The graphic play area is configured to automatically add one or more objects placed in the graphic play area when a slide is displayed in the graphic play area such that the graphic objects are appended to that slide. Thus, the system and method allows a user to easily modify a slide show by simply placing one or more graphic objects, such as text, onto a slide currently being displayed in the graphic play area.

A system in accordance with an embodiment of the invention includes a play area displayed in a display device and a media manager module. The play area is used to sequentially display slides of a sequential media. The play area has an agglomerative property such that a graphic object placed in the play area when a particular slide is displayed in the play area is automatically added to the play area and appended to the particular slide. The media manager module is configured to sequentially provide the slides to the play area to play the sequential media. The media manager module is further configured to provide the particular slide with the graphic object when the graphic object has been appended to the particular slide.

A method in accordance with an embodiment of the invention includes displaying a particular slide of a sequential media in a play area of a display device. The play area is used to sequentially display the slides of the sequential media. The play area has an agglomerative property for graphic objects placed in the play area. The method also includes placing a graphic object in the play area when the particular slide is displayed in the play area. The method further includes automatically adding the graphic object to the play area such that the graphic object is appended to the particular slide for subsequent sequential display of the slides in the play area, including the particular slide with the graphic object.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 8a depicts inserting an image into a slide show by the drawing of an arrow.

FIG. 8b shows the newly created list of images in the Slide Show resulting from the insert made in FIG. 8a.

FIG. 11a depicts resizing a Play Rectangle (PR) and the image playing within it.

FIG. 23 shows a Play Rectangle in accordance with another embodiment of the invention.

FIG. 24b illustrates dragging of text onto a picture of a slide displayed in the Play Rectangle of FIG. 23 to add the text to the slide.

DETAILED DESCRIPTION

Figure 1:
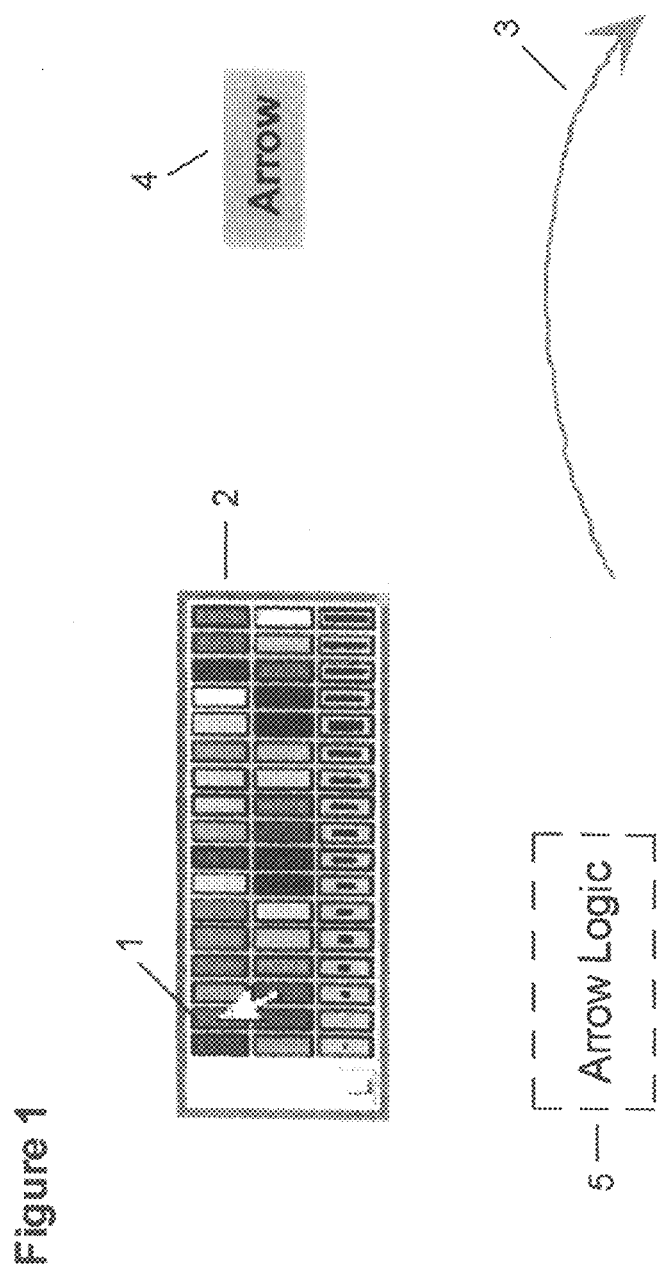
FIG. 1 depicts the calling forth of an arrow logic using a color from an inkwell, an arrow switch and the action of drawing onscreen.

A system and method for creating, playing and modifying slide shows in accordance with an embodiment of the invention permits a user to create sequential media (i.e., slide shows) without being required to use frames and the placement of slides as utilized by presentation computer programs common in the art. Instead of selecting commands from pull down menus or the like, the system and method supports the creation of sequential media by graphical means, which does not utilize pull down menus, task bars or the like. In addition, the system and method permits the user to modify slide shows by simply placing graphic object, such as text, onto a slide currently being displayed.

The system and method is described below with respect to a computer operating environment referred to herein as a "Blackspace" environment. The word "Blackspace" is a trademark of the NBOR Corporation. The Blackspace environment presents one universal drawing surface that is shared by all graphic objects within the environment. The Blackspace environment is analogous to a giant drawing "canvas" on which all graphic objects generated in the environment exist and can be applied. Each of these graphic objects can have a user-created relationship to any or all the other objects. There are no barriers between any of the objects that are created for or exist on this canvas. However, the invention is not limited to the Blackspace environment and can be implemented in any computer operating environment.

As used herein, the term "objects" include recognized graphic objects (e.g., stars, squares, circles, arrows, etc.), free drawn objects (sketches, drawings, lines, etc.), pictures in various file format (.png, .jpg, .bmp, .gif, etc.), graphic control devices (switches, faders, knobs, joysticks, etc.), videos in various file format (.mpg, .avi, .mov, etc.), text, and other graphic objects that are displayed on a display device. In addition, the term "image" may be interchangeably used herein with the term "slide". Thus, an image or slide contents of a slide show may include one or more graphic items, such as "objects" defined above.

To create a slide show using the system and method in accordance with the invention, a user selects a color from a graphic inkwell and then draws a special arrow (e.g., a blue arrow) which has an arrow logic of "sequential ordering" assigned to it. This arrow logic is recalled by selecting a color that corresponds to that arrow logic. For more information regarding arrow logics, see pending U.S. patent application Ser. No. 09/880,397. As described in more detail below, when the special arrow is drawn such that the arrow intersects multiple computer files (e.g., picture or image files), a slide show of items represented by those selected files can be crated. The order of the items in the slide show is determined by the order in which the file names were intersected by the special arrow. Thus, one of the key benefits of the system and method is that it permits a user to draw a single arrow to select multiple items (e.g., image files) in a particular order to create a slide show of slides represented by the selected items in that particular order.

The process for drawing a special arrow for creating a slide show in accordance with an embodiment of the invention is described with reference to FIG. 1. As shown in FIG. 1, a user selects a color 1 in a graphic inkwell 2 on the global drawing surface of the Blackspace environment displayed on a display, such as a computer monitor. An arrow switch 4 is then turned on and an arrow 3 is drawn that calls forth a specific arrow logic 5, which in this case is the arrow logic "sequential ordering". One way to draw the arrow 3 is to left-click on the global drawing surface and drag the cursor to create the arrow on the surface. The default color for the arrow logic "sequential ordering" is the color blue. However, this color setting is a user modifiable parameter. In other words, the color of the arrow for the "sequential ordering" arrow logic can be changed to another color by the user. This can be done according to the approaches described in the pending U.S. patent application Ser. No. 09/880,397.

Figure 2:
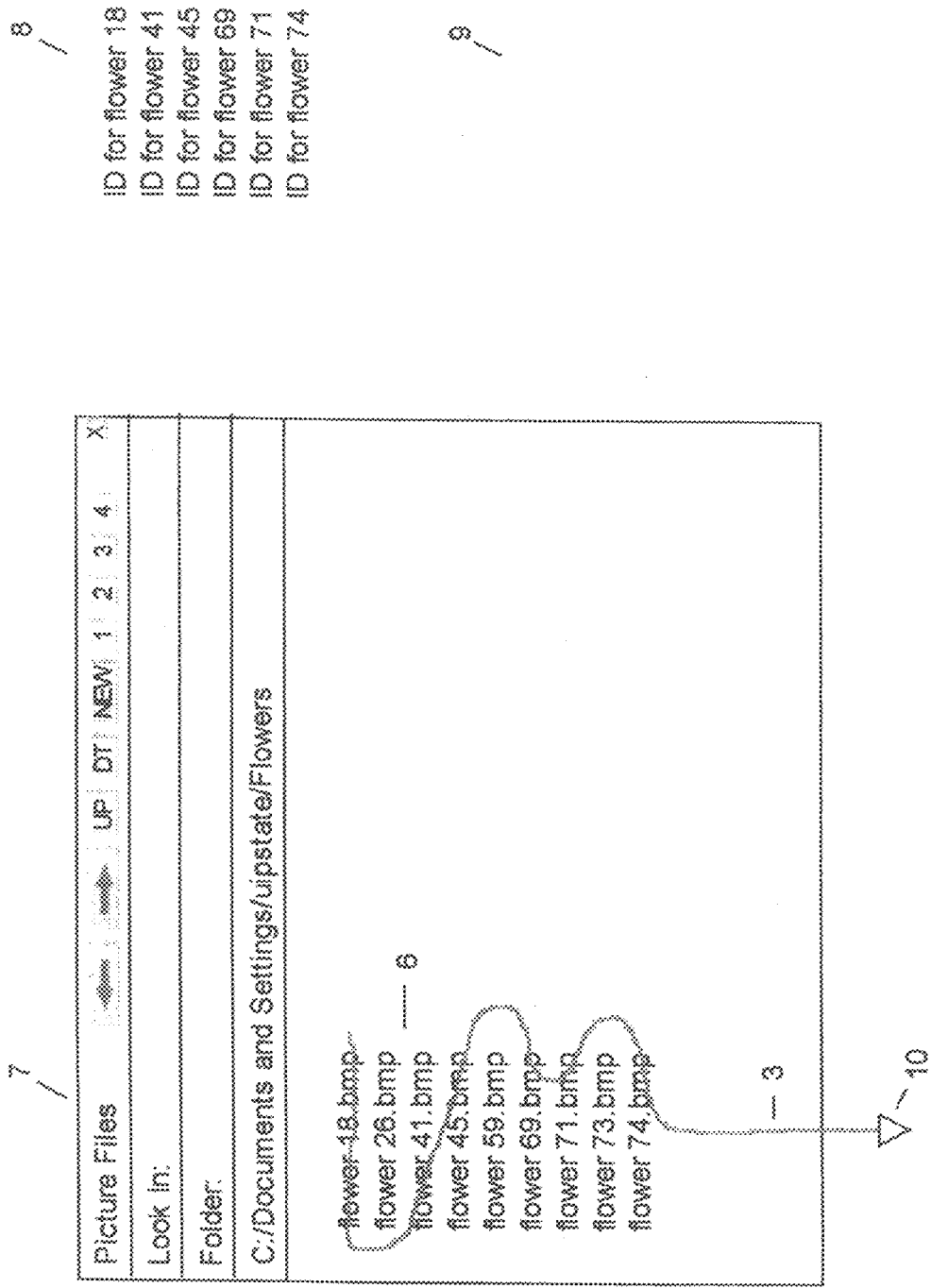
FIG. 2 depicts the creation of a slide show with the drawing of an arrow onscreen.

The special arrow for creating a slide show can be drawn such that the arrow intersects computer files, such as picture files, in a particular order so that the slide show will include the items represented by the intersected files in that particular order, as illustrated in FIG. 2. In FIG. 2, a blue arrow 3 is drawn to intersect various picture files in a picture file list 6, which may be displayed in a picture file a [Virtual or Visual] Display and Control Canvas (VDACC) object 7. The term "VDACC" is a trademark of NBOR Corporation. A VDACC object includes a workspace surface or canvas that may be larger than the visible or viewable area of the VDACC object. Thus, a VDACC object allows a user to scroll the visible area to view graphic objects or contents in the VDACC object that were hidden from the visible area. However, the objects that appear to be in the VDACC object exist on the global Blackspace canvas. For more information about VDACC objects, see pending U.S. patent application Ser. No. 10/671,953, entitled "Intuitive Graphic User Interface with Universal Tools", filed Sep. 26, 2003, which is incorporated by reference herein.

The picture files are represented by text objects in this list 6. Each text object that the shaft of the arrow 3 intersects will be added to the source list 8 of the arrow. Any object intersected by the head (tip) of the arrow 3 is added to the target list 9 of the arrow. In this illustration, no object is intersected by the head of the arrow 3 and the target list 9 is empty. The shaft of the arrow 3 is a line that must intersect some part of one or more characters belonging to a text object in the list 6 in order for that text object to be selected by the drawing of the arrow 3. In FIG. 2 non-contiguous text objects in the list 6 have been selected by the drawing of the arrow 3. A user can literally draw that line of the arrow 3 in any direction to intersect any one or more text objects in the list 6 and this will result in the selection of all items that have had any part of one or more of their characters intersected by the arrow.

The selected text objects appear in the source list 8 of the arrow 3. In reality, the selected objects are listed according to their IDs, not their text object name. For the sake of illustration, each of the selected objects is shown with both the text object name and the corresponding ID in the source list 8 of the arrow 3. The blue arrow 3 is drawn such that the tip of the arrow points to the global drawing surface of the Blackspace environment. In this case, the target list of the arrow 3 will be empty, indicating that a new slide show is to be created rather than updating an existing one. After drawing the blue arrow 3 and upon a mouse up-click, the head 10 of the arrow 3 turns white, which indicates that the arrow has been properly drawn.

Figure 3:
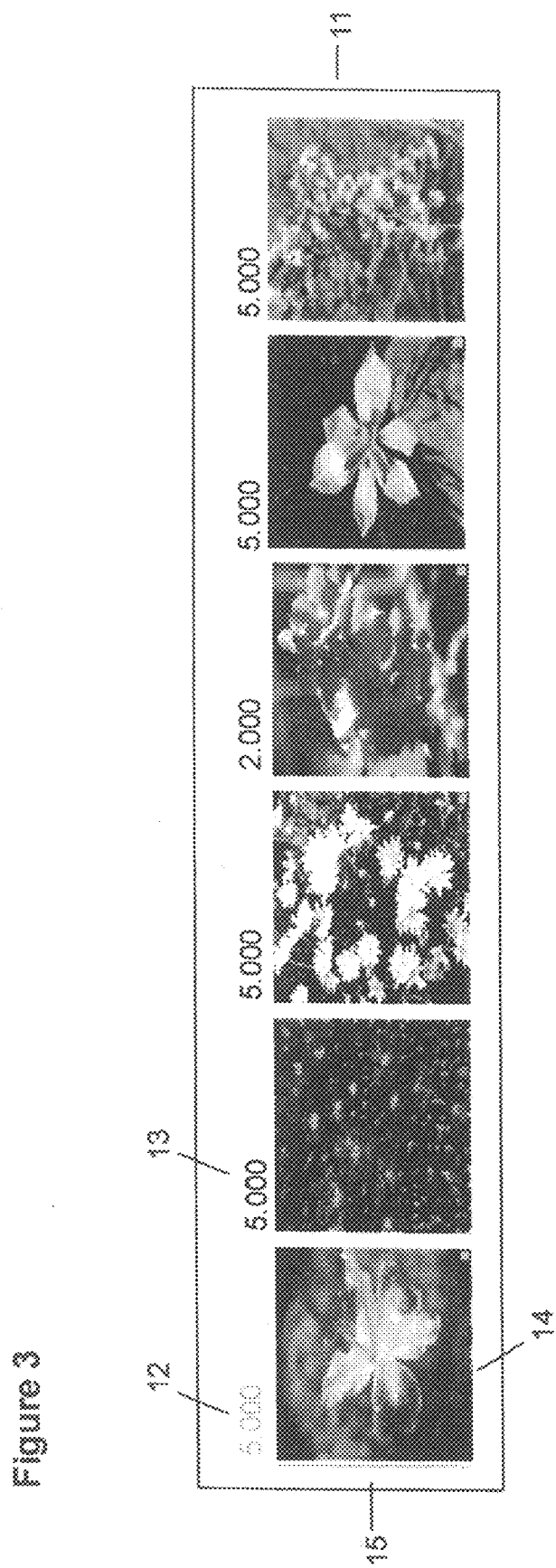
FIG. 3 shows one result from the drawing of the blue arrow 3 in FIG. 2, namely, the creation of a Slide Show VDACC.

As shown in FIG. 3, after the arrow 3 is drawn, the arrow logic associated with that arrow can be activated to create a Slide Show VDACC object 11 that includes the pictures of the selected picture files. The arrow logic associated with the arrow 3 may be activated by left mouse clicking on the white arrowhead 10 of the arrow 3 or by some equivalent means. When the arrow logic is activated, the blue arrow 3 disappears along with its white arrowhead 10 and the Slide Show VDACC object 11 appears on the global drawing surface of the Blackspace environment. Inside the Slide Show VDACC object 11 are a number of smaller VDACC objects that have one image inside of each of them. Each of these images is presented in their own small VDACC object, as illustrated by the VDACC object 14, in the order that the corresponding picture files were intersected by the blue arrow 3, as shown in FIG. 2. These slide show images and the small VDACC objects that contain the images are sometimes used herein interchangeably. Above each picture is a duration editor, such as the duration editor 13 for the second picture from the left, which is shown in seconds—"5.000". A feature of the duration editor is also shown in FIG. 3. This feature is that for the slide (or the picture) that is currently playing, its duration editor turns green, as illustrated by the duration editor 12. Also shown in FIG. 3 is a play cursor 15, which appears at the far left edge of the first image in the first small VDACC object 14 in the Slide Show VDACC object 11.

Figure 4:
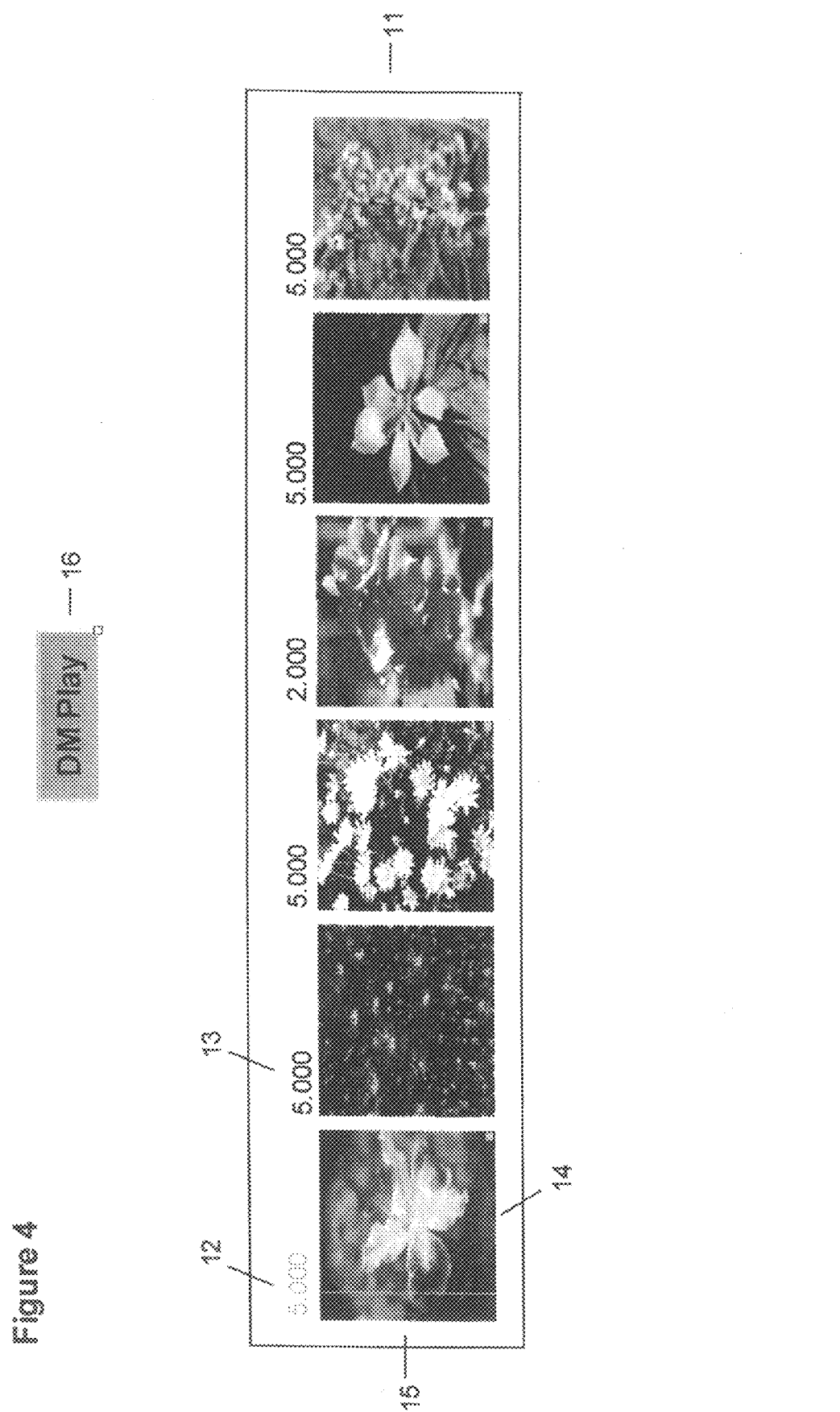
FIG. 4 depicts a method of playing a slide show.

Referring now to FIG. 4, to play a slide show in the Slide Show VDACC object 11 in accordance with an embodiment of the invention, a DM Play switch 16 is turned on. As described in more detail below, in an embodiment of the invention, the playing of a slide show involves playing a Dyomation session, which is controlled by a Dyomation manager of the Blackspace program.

When the DM play switch 16 is activated, the green play cursor 15 starts to move through the first image (the far left image) in the Slide Show VDACC object 11 from the left of the first slide show image toward the subsequent slide show images in the Slide Show VDACC object. The length of time that it takes for the play cursor 15 to move through each image or slide equals the length set by each slide's duration editor. In the example of FIG. 3, each image is set to a duration of 5.000 seconds.

The Slide Show VDACC object 11 is not generally used for playing back a slide show, because the images are too small. The value of the Slide Show VDACC object 11 is as an overview and for editing the slide show. The following three types of edits will be discussed.

1. Changing the onscreen time of one or more slide show images.
2. Changing the order of one or more slide show images.
3. Inserting one or more images into a slide show.

1. Changing the Onscreen Time of One or More Slide Show Images.

Figure 5:
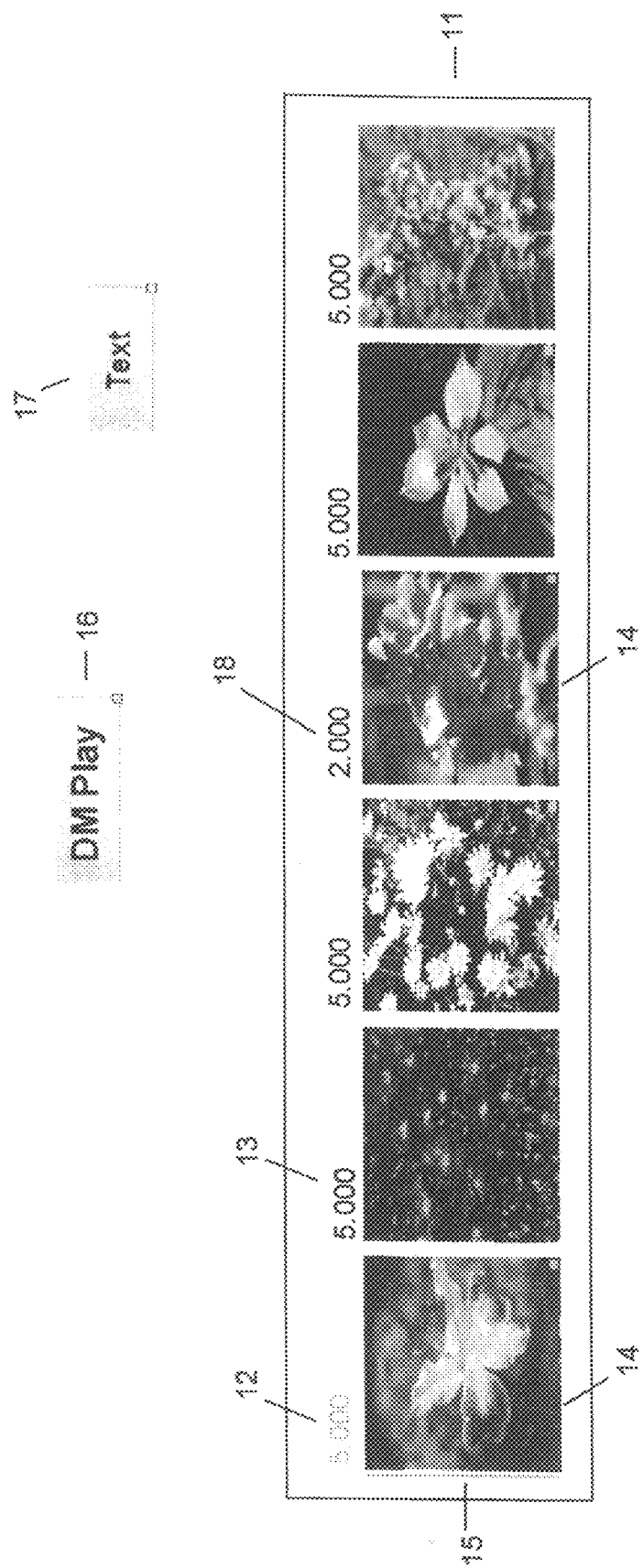
FIG. 5 depicts changing the onscreen time for an image in a slide show by typing a new number into its duration editor.

There are many ways to change the onscreen time of one or more slide show images. One of these ways is illustrated in FIG. 5 with respect to the slide show image of the small VDACC object 14 (the fourth slide show image from the left) in the Slide Show VDACC object 11. The duration editor 18 for this slide can be changed by first turning on a text switch 17 and placing a text cursor into the duration editor by a left mouse click or some other suitable input. The text switch 17 allows text, which includes numbers, to be entered in the Blackspace environment. The duration editor 18 can then be changed by deleting and/or typing in one or more numbers. In the example of FIG. 5, the duration editor has been changed from 5.000 seconds to 2.000 seconds. This means that when this slide show image is played in the slide show, the image will remain onscreen for only 2 seconds, not 5 seconds.

Figure 6:
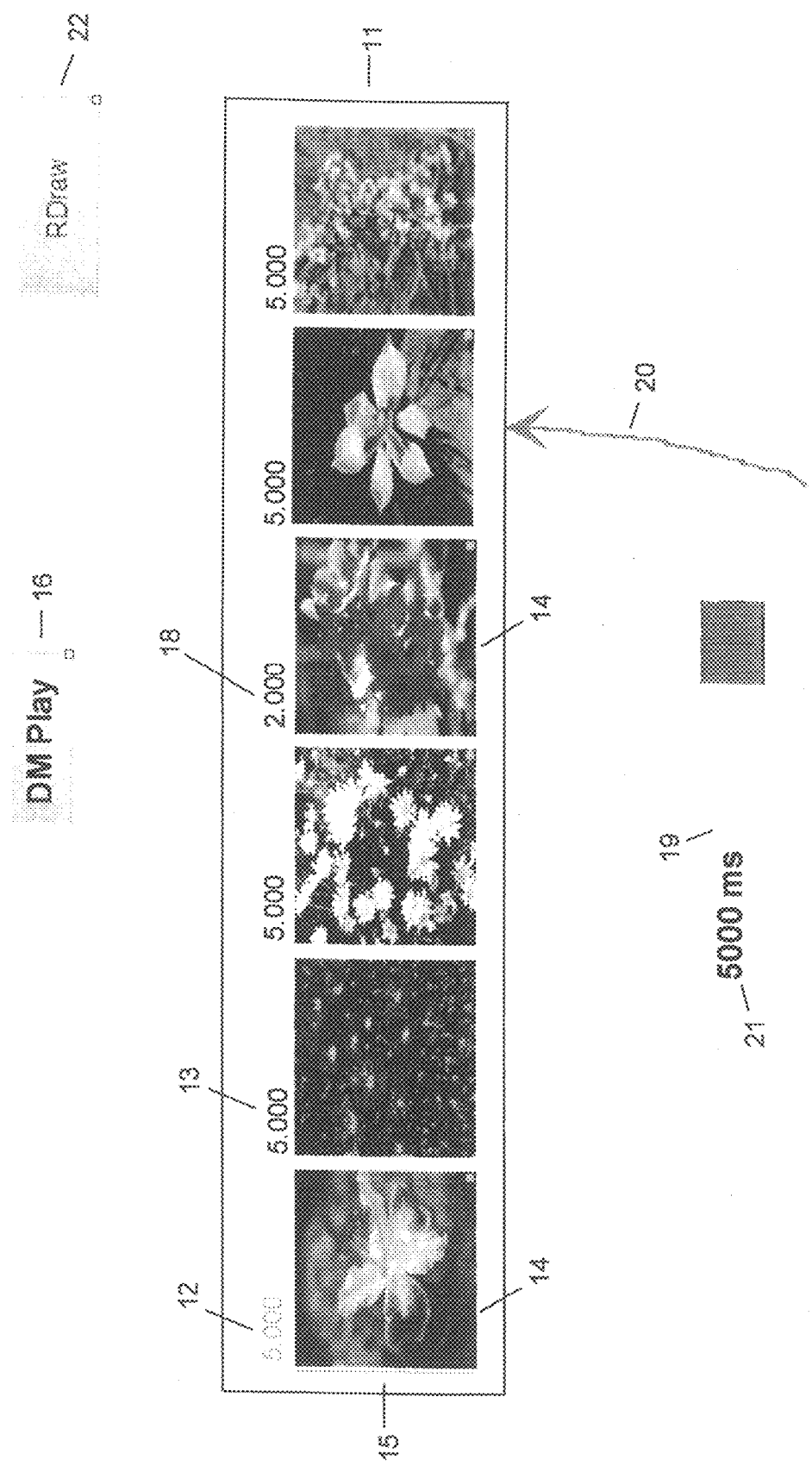
FIG. 6 depicts using a fader to alter the onscreen time for one or more images in a slide show.

Another way to change the onscreen time of images in a slide show is shown in FIG. 6. In FIG. 6, a RDraw switch 22 has been turned on to activate the Recognize Draw Mode. In this mode, certain drawings are recognized by the Blackspace program. As an example, a straight horizontal line with a C-shaped line drawn along the line will be recognized as a fader. Using this feature, a fader 19 is created and a red arrow 20 with a "control" arrow logic assigned to the arrow is drawn to intersect the fader and point to the Slide Show VDACC object 11. This control arrow logic can be stated by the following sentence: "the object(s) that the arrow is drawn from controls the object(s) that the arrow points to." After drawing the arrow 20 as shown in FIG. 6, the head of the arrow turns white. Clicking on the white arrowhead establishes the fader 19 as a duration control for all of the images in the Slide Show VDACC object 11 at one time.

If the fader 19 is then moved to the right, the duration values for all of the images in the Slide Show VDACC object 111 are increased. If the fader 19 is moved to the left, these duration values are decreased.

Alternatively, if the red arrow 20 is drawn to intersect the fader 19 and only one image in the Slide Show VDACC object 11, then this fader will control the duration time for that image and no others. The operation of the fader 19 is the same as described above.

There are various ways to ensure that a drawn fader is programmed to be a duration control. One way is that the Blackspace program has a default setting determining that any fader intersected by a red arrow, where the arrow points to a Slide Show VDACC object or to any image in a Slide Show VDACC object, will automatically be programmed to be a duration fader.

Another way to ensure that a drawn fader is programmed to be a duration fader is illustrated in FIG. 6. A text object "5000 ms" 21 was typed onscreen. This text object 21 could be any time value, such as seconds, or frames, etc. The text object 21 is typed to intersect the fader 19. As an alternate, the text object 21 could be dragged to intersect the fader 19. In either case, when a collision is detected between the text object 21 and the fader 19, text object snaps to a position that is determined by the Blackspace program. This position could be directly above the fader 19, below it or anywhere on screen. Once this text object 21 appears onscreen, the user can drag it to a new position where it will remain until the user moves it again.

2. Changing the Order of One or More Slide Show Images.

Figure 7:
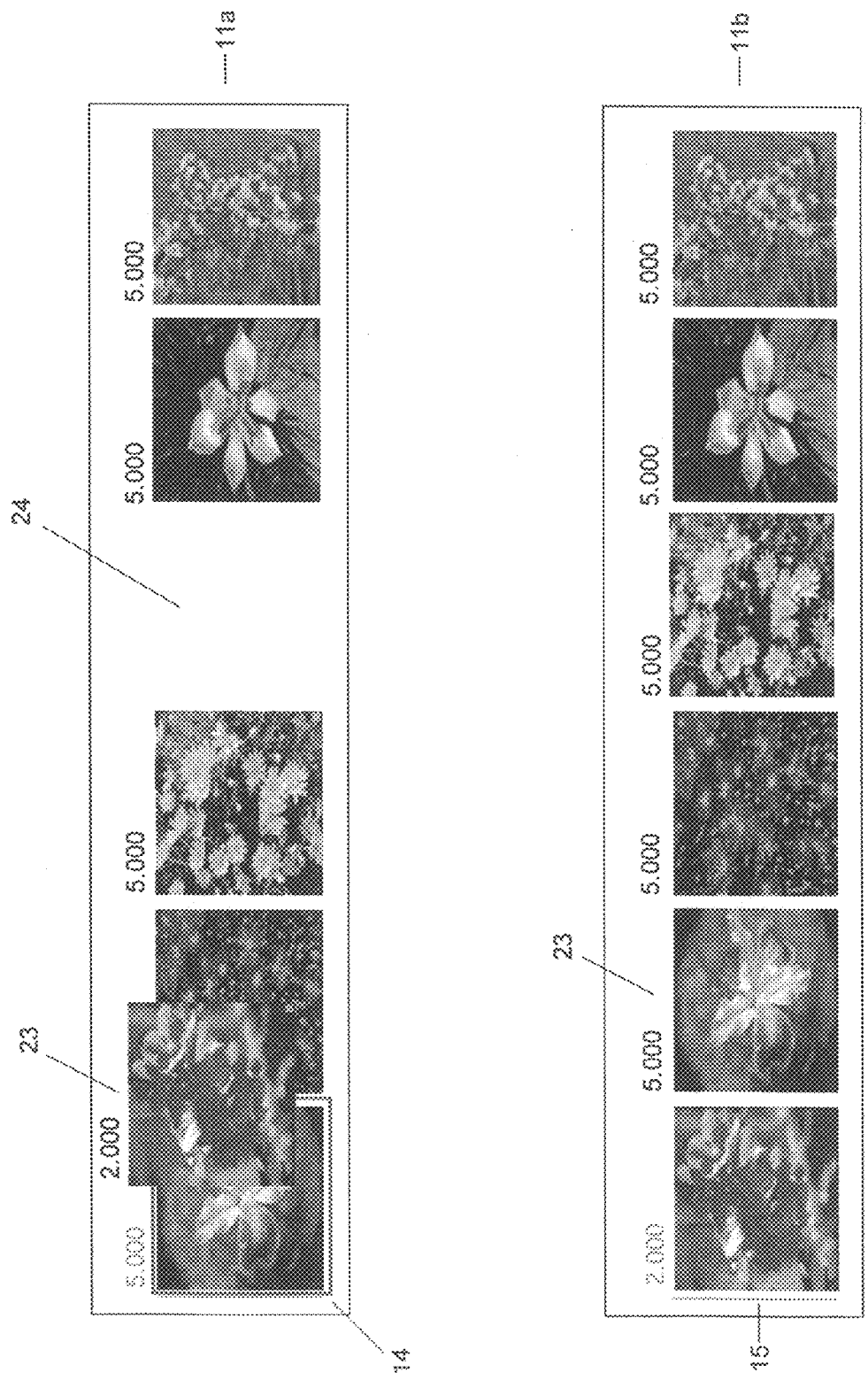
FIG. 7 illustrates changing the order of the images in a slide show by dragging an image from one location to another within the Slide Show VDACC object.

The process for changing the order of one or more slides show images in a Slide Show VDACC object in accordance with an embodiment of the invention is illustrated in FIG. 7. In FIG. 7, an image 23 (which is actually an image in a small VDACC object) is being dragged from its previous position 24 in the slide show VDACC object 11a to a new position as the first image in the slide show. When this image 23 is dragged to overlap the first image, a blue insert rectangle 14 appears around this first image. This blue rectangle 14 tells the user which image the dragged image will be inserted in front of. Upon a mouse up-click, the dragged image 23 will be inserted in front of the first image in the Slide Show VDACC object 11a. When the reordering of the slides occurs, all of the small VDACCs in the Slide Show VDACC object 11a are repositioned, as shown by the Slide Show VDACC 11b. The dragged image 23 snaps into the first slide position and what was the first image moves to position two. What was the third slide is moved to position four. Since the play cursor 15 is sitting at the left edge of image one, the duration editor for the slide one (the newly dragged image) turns green to indicate that it is the slide currently selected to play.

3. Inserting One or More Images into a Slide Show.

Figure 8B:
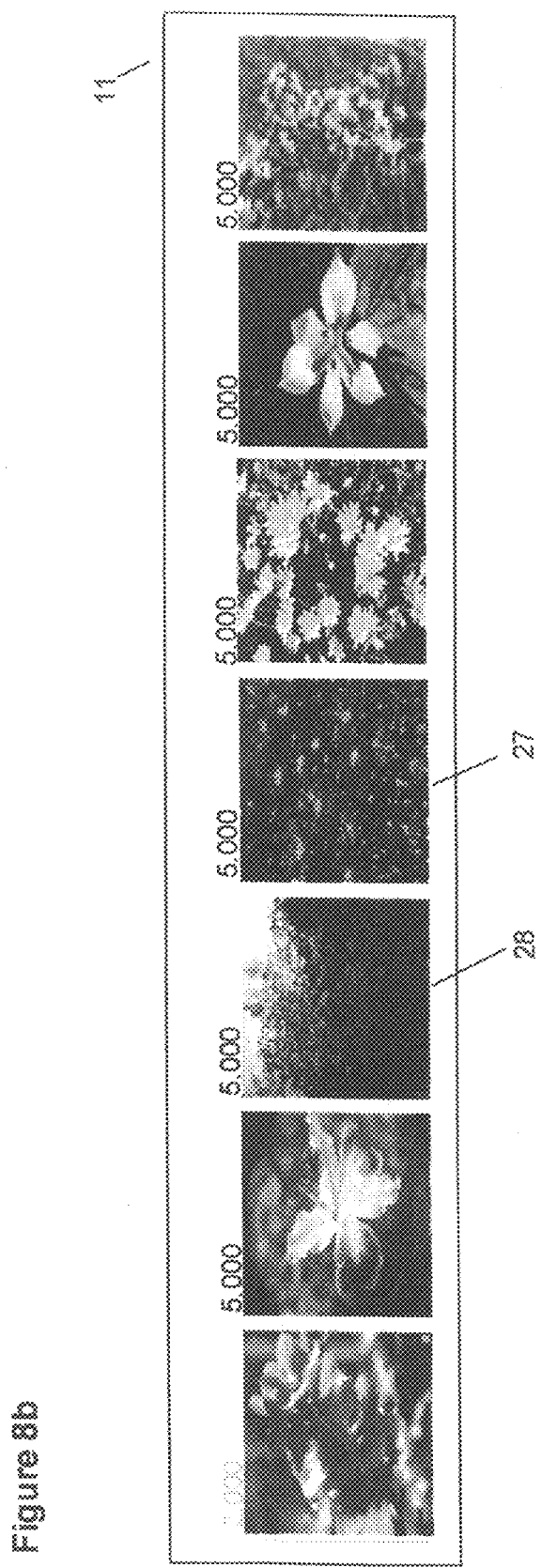

The process for inserting one or more images into a Slide Show VDACC object in accordance with an embodiment of the invention is illustrated in FIGS. 8a and 8b. In FIG. 8a, a blue arrow 3 has been drawn to intersect the text object "flower 26.bmp" in the Picture Files VDACC object. The tip of this arrow 3 has been drawn to overlap the third image in the Slide Show VDACC object 11. The source item for this arrow 3 is the text object "flower 26", which represents a picture or photo saved on the hard drive. The target item for this arrow 3 is the third small VDACC object 27 in the Slide Show VDACC 11.

When the arrow logic associated with the arrow 3 is activated, e.g., a left mouse click on the arrowhead 10, the image "flower 26" snaps in front of the small VDACC object 27. All of the images in the Slide Show VDACC object 11 that exist to the right of the newly placed image "flower 26" will move the space of one image to the right.

FIG. 8b shows the newly created list of images in the Slide Show VDACC object 11. The slide show image 28 has now been inserted into the Slide Show VDACC 11 in front of the image 27. All of the other images occurring later than image 27 have been moved to the right in the Slide Show VDACC 11.

Playing a Slide Show in a Play Rectangle (PR).

Figure 9:
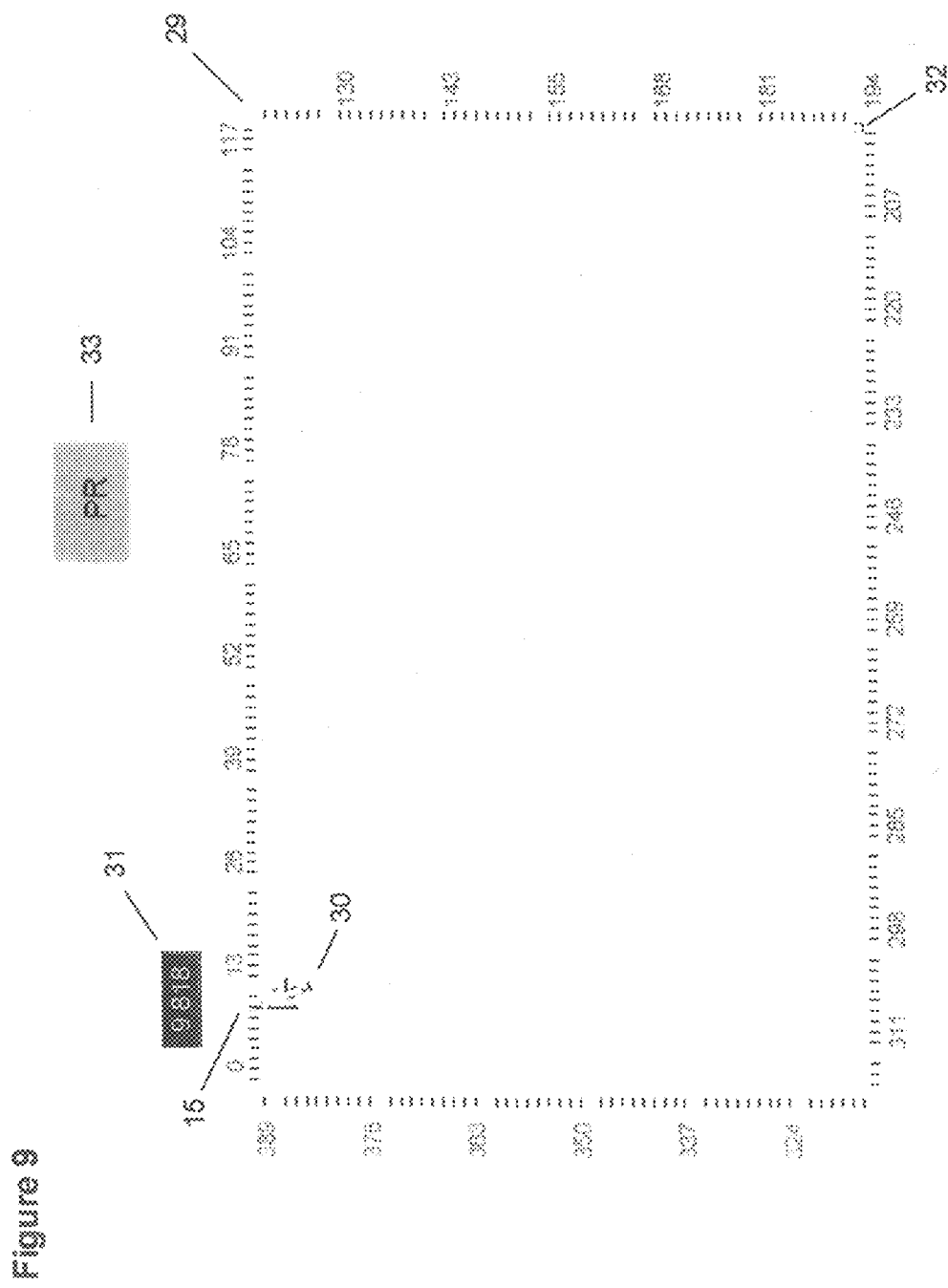
FIG. 9 is an illustration of a Play Rectangle (PR).

FIG. 9 shows a Play Rectangle (PR) 29 in accordance with an embodiment of the invention. A user can create a PR, by first creating a switch 33, e.g., by using Object Points (see pending U.S. patent application Ser. No. 10/103,680, which is incorporated herein by reference), and then typing the letters PR on the switch. When the switch 33 is then activated, e.g., left-clicked on, the PR 29 immediately appears. For a detailed explanation of the PR, see U.S. patent application Ser. No. 10/635,747, entitled "Method for Creating and Using Linear Timeline and Play Rectangle", filed on Aug. 5, 2003, which is specifically incorporated by reference herein.

In appearance, the PR 29 looks like a timeline with four sides. But the PR 29 offers functions beyond that of any timeline. For instance, the PR 29 can be used to both reposition and resize the images playing back as sequential media (as in a slide show), which are sequentially ordered by selecting them with a blue arrow and pointing that arrow to the global drawing surface of the Blackspace environment, as described above.

The PR 29 has a play cursor 15 that moves along the outer edge of the PR as media plays. Floating the mouse cursor 30 over the play cursor 15 will cause a parameter 31 to appear showing the exact time of the play cursor's location along the PR 29. This play cursor 15 can be left-clicked on and dragged clockwise or counter-clockwise along the PR 29. As the play cursor 15 is dragged, the parameter 31 changes to always show the exact location of the play cursor along the PR 29. As the play cursor 15 is dragged, the media assigned to the PR 29 will play backwards or forwards, depending upon the direction and speed of the drag. A clockwise drag yields a forward direction of play and a counterclockwise drag yields a reverse or backward direction of play.

Using the play cursor on a PR is a strong navigational tool. One reason is that when the DM Play switch (or its equivalent) is activated, the overall time of any timeline, including a rectangular timeline (a PR), will automatically change to equal the overall length of the sequential media, e.g., the slide show. For instance, if the slide show is 60 seconds long, when the DM Play switch is turned on to play the slide show, any visible timeline, including the PR, will have its overall length of time changed to equal 60 seconds. With the full length of a media presentation shown along a PR, a user can left-click anywhere along the PR and place the play cursor to play any section of that media. Everything is visible to the user on the PR, including the images themselves.

Figure 10:
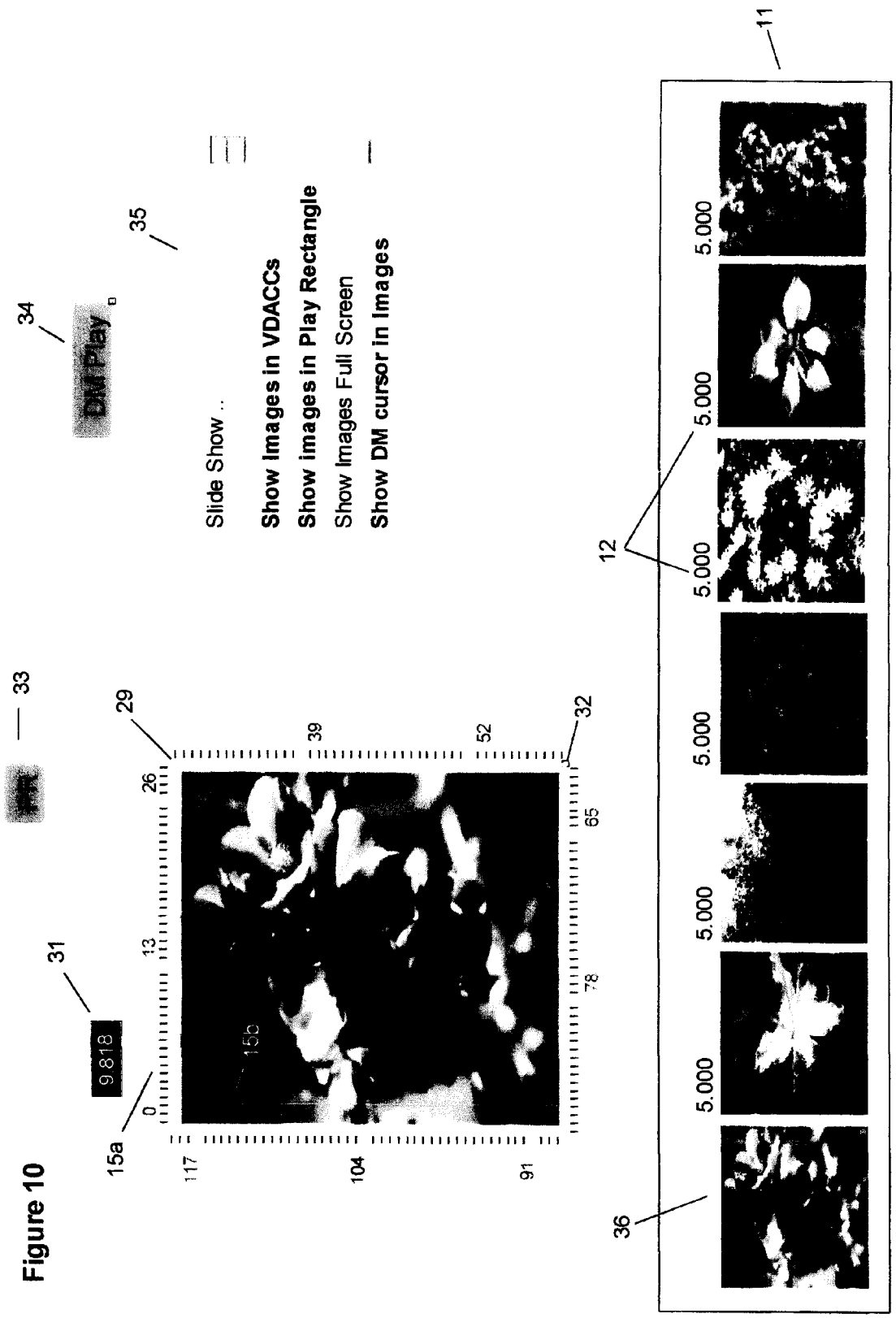
FIG. 10 depicts playing slide show images in a Play Rectangle (PR).

FIG. 10 shows a special feature of the PR 29, which is that images in a piece of sequential media, e.g., a slide show, can be made to play such that the images fill the inside area of the PR. To accomplish this a user creates a PR switch 33, e.g., by using Object Points to create a blank switch and then typing the letters PR on that switch. The switch 33 is then turned on by clicking on it. When this switch 33 is activated, the PR 29 appears onscreen at a default size. When the PR 29 appears, the image 36 in the Slide Show VDACC object 11 that is currently set to be played appears in the PR such that the image fills the entire inner area of the PR.

Then when the DM Play switch 34 or its equivalent is activated, the images in the Slide Show VDACC object 11 are played back in a sequential order. This order equals the order that the images appear in the Slide Show VDACC object 11. The onscreen time for each of these images is determined by the duration editor 12 for each slide. The action of having the images of the slide show automatically appear in the PR 29 is controlled by a user input, such as a keystroke(s) or a selection of an entry in the Info Canvas object 35 (a graphic menu-like object) for the DM Play switch 34. For more information about VDACC objects, see pending U.S. patent application Ser. No. 10/671,953, entitled "Intuitive Graphic User Interface with Universal Tools", which is incorporated by reference herein. To access this entry in the Info Canvas Object 35, a user right-clicks on the DM Play switch 34 and its Info Canvas object 35 appears. In this Info Canvas object 35 is a category entitled: "Slide Show." When this category is activated, i.e., left-clicked on, the entries that belong to this category appear onscreen. In the Info Canvas object 35, three entries are selected: (1) "Show Images in VDACCs", (2) "Show images in Play Rectangle", and (3) "Show DM Cursor in Images".

The entry "Show Images in VDACCs" activates the appearance onscreen of the Slide Show VDACC object 11.

The entry "Show images in Play Rectangle" activates the usage of the PR 29 if one has been created as described above. The entry "Show DM Cursor in Images" activates a second play cursor 15a in the PR 29. A first play cursor 15b in the timeline itself, as described above. This first play cursor 15a moves clockwise around the perimeter of the PR 29 as the slide show is played back. The second larger play cursor 15b, which equals the height of the image inside the PR 29, moves across the image in the PR from left to right as the slide show plays back. The length of time that it takes for this play cursor 15b to reach the right edge of each image presented within the PR 29 equals the duration editor time 12 for that image.

FIG. 11a shows another feature of the PR 29 when used for playing back a slide show. A user can at any time, even during the live playback of a slide show, left-click on the resize button 32 of the PR 29 and resize the PR by dragging in any direction, as illustrated by the PR 37 in FIG. 11a. When this action is carried out, the image inside the PR 29 is automatically resized to match the new dimensions of the resized PR 37.

Figure 11B:
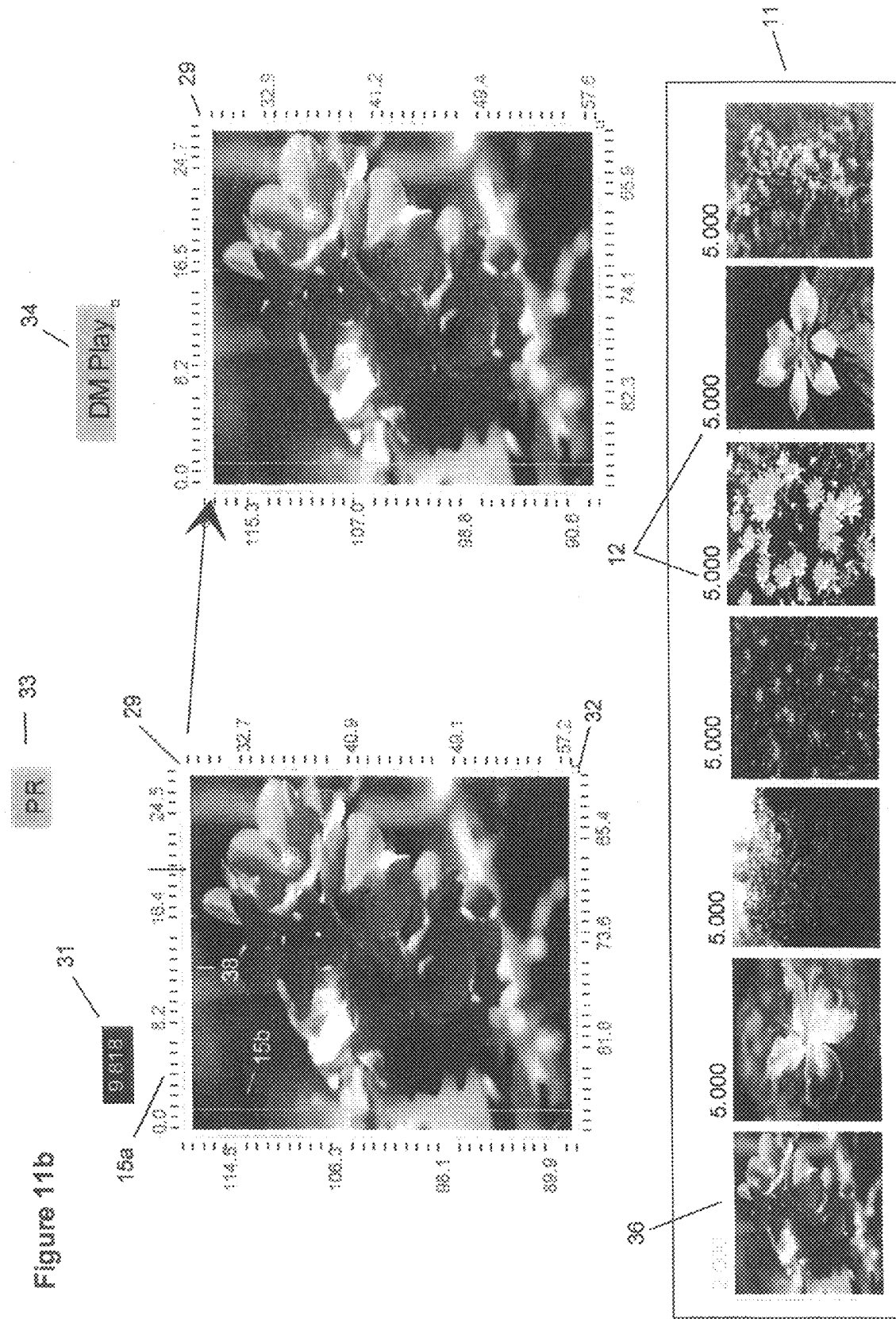
FIG. 11b depicts moving a Play Rectangle (PR) and the image playing within it.

The PR 29 can be relocated as well as resized. Referring to FIG. 11b, to relocate the PR 29, a user would left-click on the Gray Bar 38 of the PR 29 and drag in any direction. The image inside the PR 29 will be relocated with the PR.

More Functions of the Play Rectangle (PR).

Figure 12:
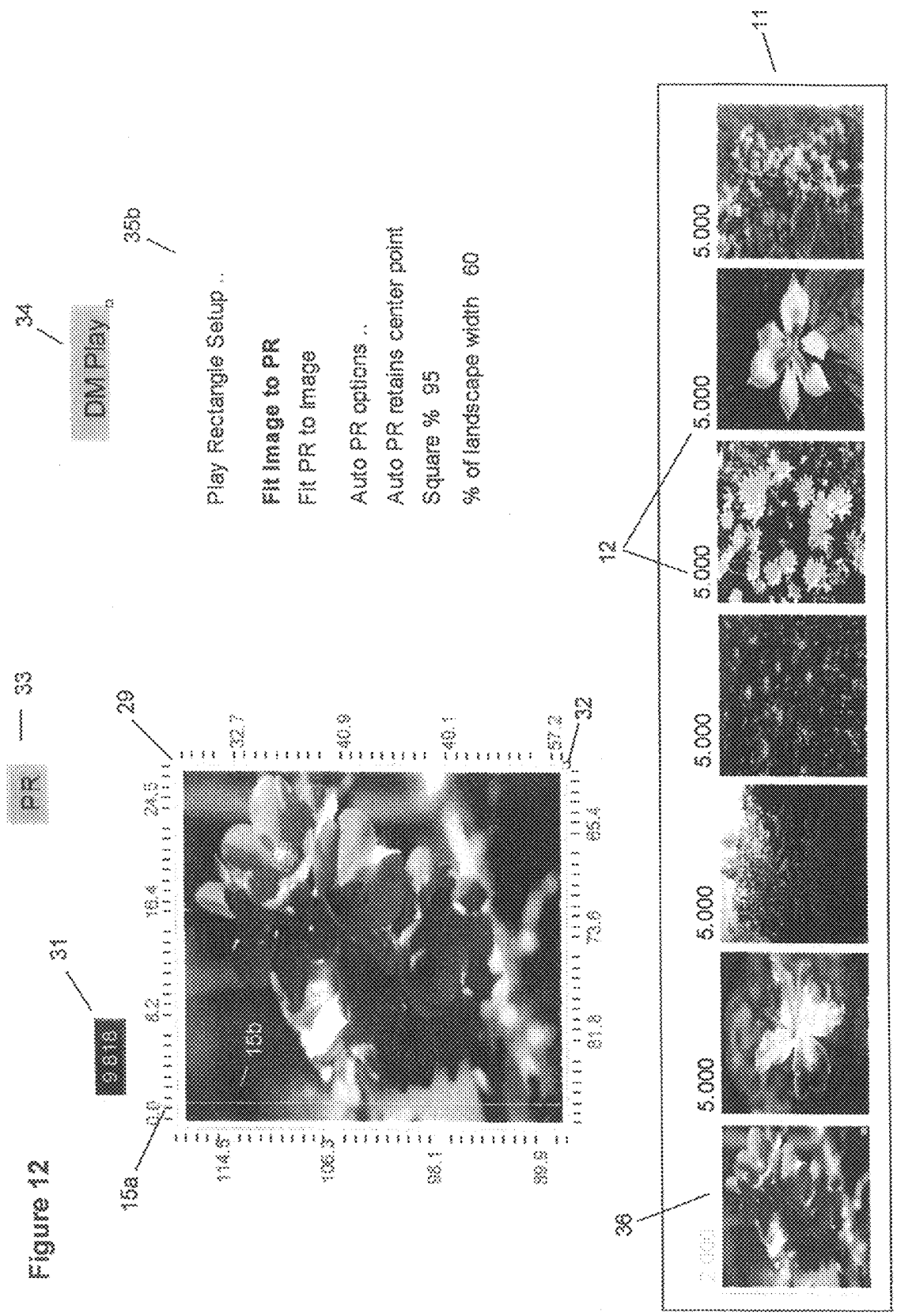
FIG. 12 depicts the general use of "Fit Image to PR."

There is another category located in the Info Canvas object 35 of the DM Play switch 34. This category is "Play Rectangle Setup" 35b, as shown in FIG. 12. This category provides additional controls for determining the behavior of the PR 29 during slide show playback. There are three basic types of operations for the PR 29 with a slide show:

A. Images are forced to fit the shape of the PR 29 regardless of their dimensions or format. In this case, neither of the entries "Fit Image to PR" and "Fit PR to Image" under the sub-category Play Rectangle Setup 35b of FIG. 12 is turned on.

B. The PR 29 controls the overall dimension of the images that are played in it, but the images themselves control the format. This mode of operation is activated by turning on "Fit Image to PR" entry under the sub-category "Play Rectangle Setup" 35b of FIG. 12.

C. The PR changes both its format and dimensions to match the format and dimensions of each image playing within it. This mode of operation is activated by turning on "Fit PR to Image" entry under the sub-category "Play Rectangle Setup" 35b of FIG. 12.

A. Images Force Fit to the PR.

Figure 11C:
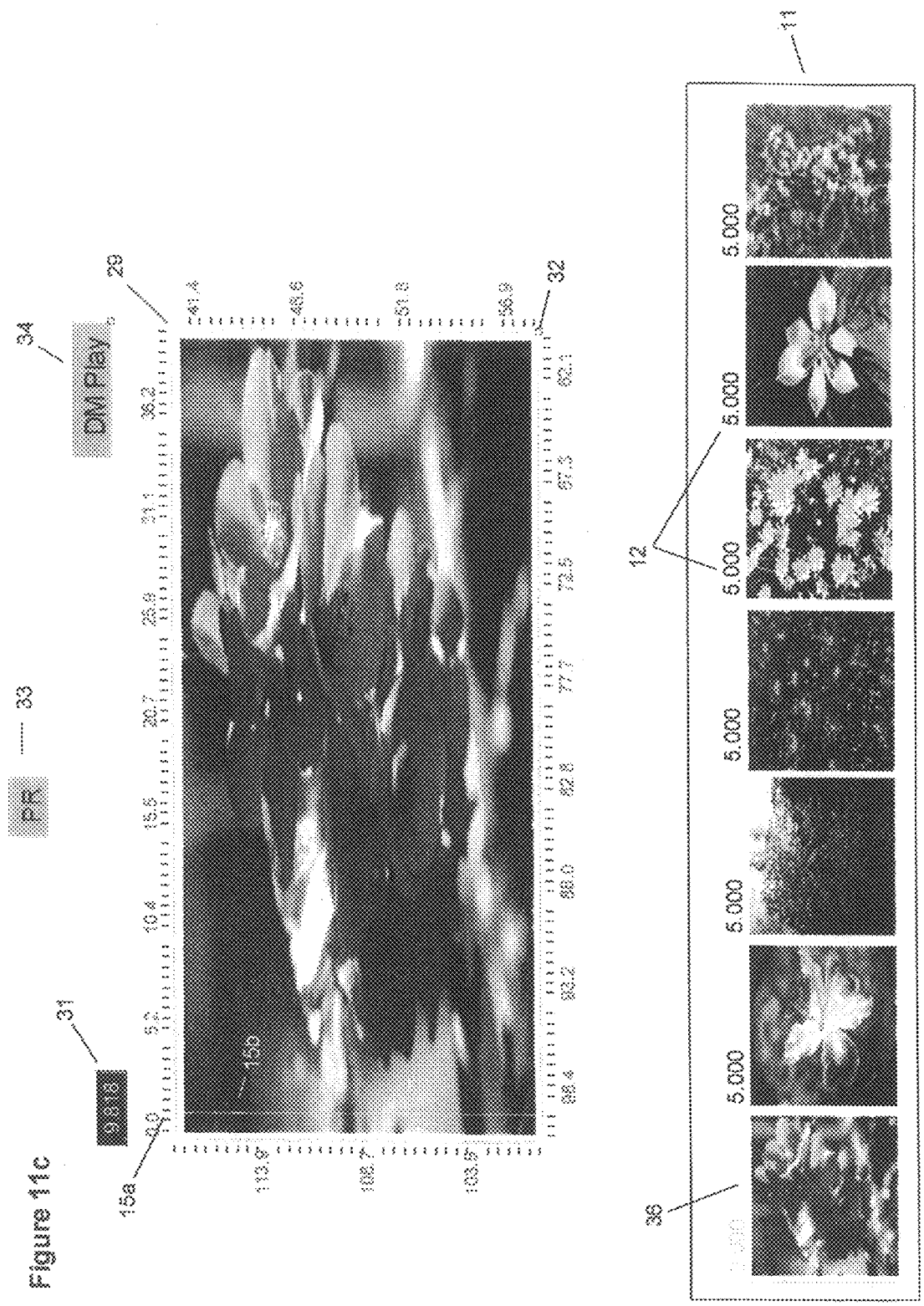
FIG. 11c is a description of an image being force fit to a PR and thereby skewed in the process.

When neither the "Fit Image to PR" nor the "Fit PR to Image" entries are turned on, the PR 29 is in full control of the geometry of all images playing in a slide shown when the PR is activated. As an example, activating the PR means turning on the PR switch 34. When this occurs the PR 29 becomes visible on the global drawing surface of the Blackspace environment and any image playing in the slide show is made to completely fill the inside space of the PR. This means that if the PR 29 is resized, as shown in FIG. 11c, by dragging its resize button 32 in any direction, the current image playing back in the slide show and all subsequent images will have their geometry changed to match the size and shape of the PR. This PR operation has the advantage of permitting users to create slide shows using any size images where all of the images are made to conform to one shape and one set of dimensions, namely, that of the PR 29. The disadvantage of this method is that all images, including landscape, portrait and square format images, are resized to fit into a single shape, that of the PR 29. As illustrated in FIG. 11c, if, for example, landscape is chosen for the shape of the PR 29, any portrait image will look skewed when it is played inside the PR because it will be resized to match the landscape format of the PR.

B. Fit Image to PR.

If the new image playing back in the slide show has got an aspect ratio of portrait and the PR 29 has got an aspect ratio of landscape, the image flips the PR's sides between its long side and its short side. To look at this more closely, the PR 29 is initially made to resemble a landscape format. This means that its width is greater than its height. Now an image that is of a portrait format is made to play in this PR 29. What happens is that the width and height of the PR 29 are swapped to become the dimensions for a portrait format and these dimensions are applied to the image playing in the PR. Similarly, if the new image playing back in the slide show has got an aspect ratio of landscape and the PR 29 has got an aspect ratio of portrait, the PR is changed to the landscape format in response to the image. The consequence of this is that a user has control of the displayed size for both formats. The user sets the shape of the PR 29, which then determines the size of all landscape, portrait and square images in the slide show. Square images are explained under the section below entitled: "Square %."

Note: Using both the Slide Show VDACC object 11 and the PR 29 onscreen can be very helpful. The PR 29 lets the user control the size and location of the images playing back in the slide show, while the Slide Show VDACC object 11 gives the user an overview so the user can see what all of the images are in the slide show, particularly what the previous and next images are with respect to the currently playing image.

C. Fit PR to Image.

Figure 13:
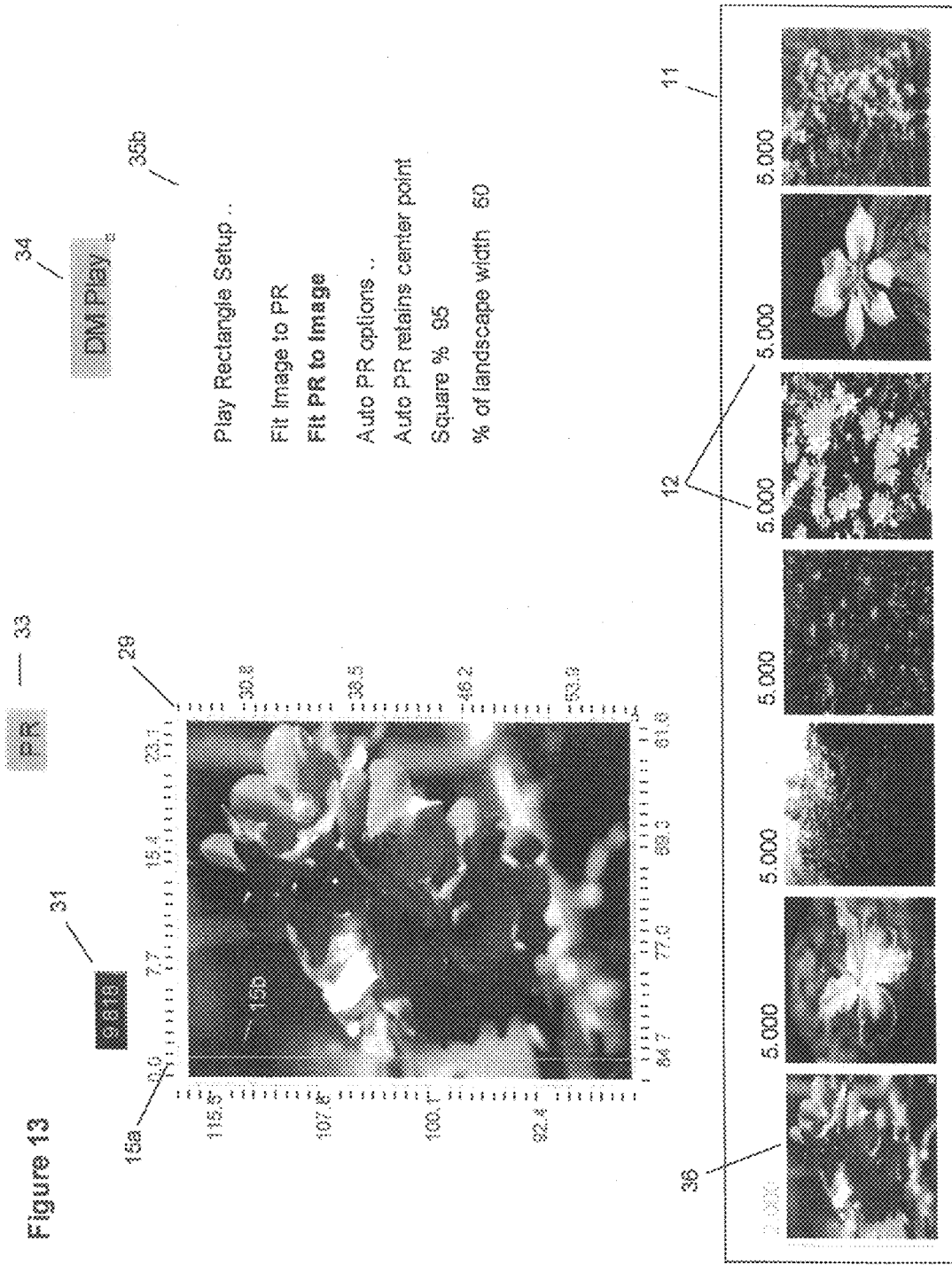
FIG. 13 show selecting "Fit PR to Image" and its affect on an image playing in a Play Rectangle (PR).

FIG. 13 shows the entry "Fit PR to Image" selected in the category "Play Rectangle Setup" in the Info Canvas object 35b for the DM Play switch 34. "Fit PR to Image" means that each image that is played back in the PR 29 determines the dimensions of the PR. As the slide show is played back, each image that is called up to play in the slide show causes the PR 29 to change to match the dimensions of this image in its native state as it is stored on a hard drive or other such storage medium. As an example, if the image 36 in FIG. 13 is a portrait image with dimensions of 4 inches wide by 6 inches high, when this image plays back in the PR 29, the dimensions of the PR will be automatically set to match the dimensions of this image, namely, 4 inches by 6 inches.

When the next image in the slide show starts to play, the PR 29 will immediately change to match the dimensions of this image. The dimensions that are matched by the PR 29 are the dimensions of the actual picture file.

Returning to the function "Fit Image to PR", there are other operations that can be applied to images in the PR 29 when the PR is in the "Fit Image to PR" mode. These are found under the sub-category entitled: "Auto PR options" located in the Info Canvas object 35b of the DM Play switch 34 under the category "Play Rectangle Setup". Note: The conditions that are to be described are only operational when "Fit Image to PR" is on. When "Fit PR to Image" is activated, none of these features matter, as the PR 29 is controlled by the dimensions of the images.

Additional functions associated with "Fit Image to PR" are as follows:

1. Auto PR Retains Center Point.

Figure 14:
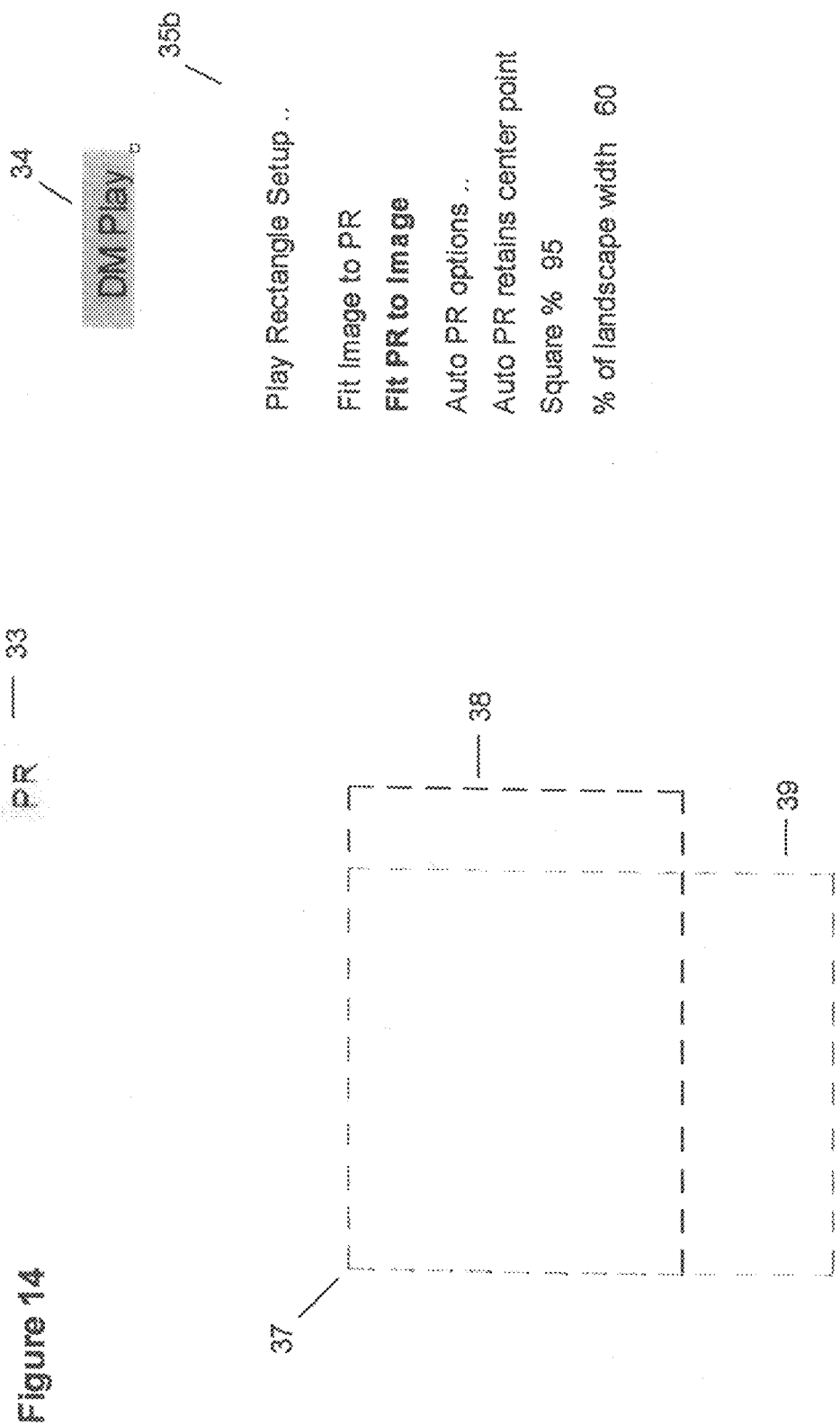
FIG. 14 shows the default alignment of images' upper left corner to the upper left corner of a PR as they are played back within a PR in a slide show.

Referring to FIG. 14, what is shown here is the condition when the entry "Auto PR retains center point" is off. This may be the default setting for playing the slide show. With this option off, all of the images that play back in a PR 37 are aligned by their upper left corners to the upper left corner of the PR. Landscape 38 and portrait 39 images change the dimensions of the PR 37 to match the dimensions of these native saved picture formats (the dimensions that the pictures have as raw picture files stored on a hard drive, CD or other storage medium). But, each of these images is aligned to the previous image by matching the coordinates of its upper left corner to the coordinates of the upper left corner of the PR 37. In other words, in this mode, the upper left corner of the PR 37 is fixed, although the rest of it will change to match the overall geometry of each new image played in it.

Figure 15:
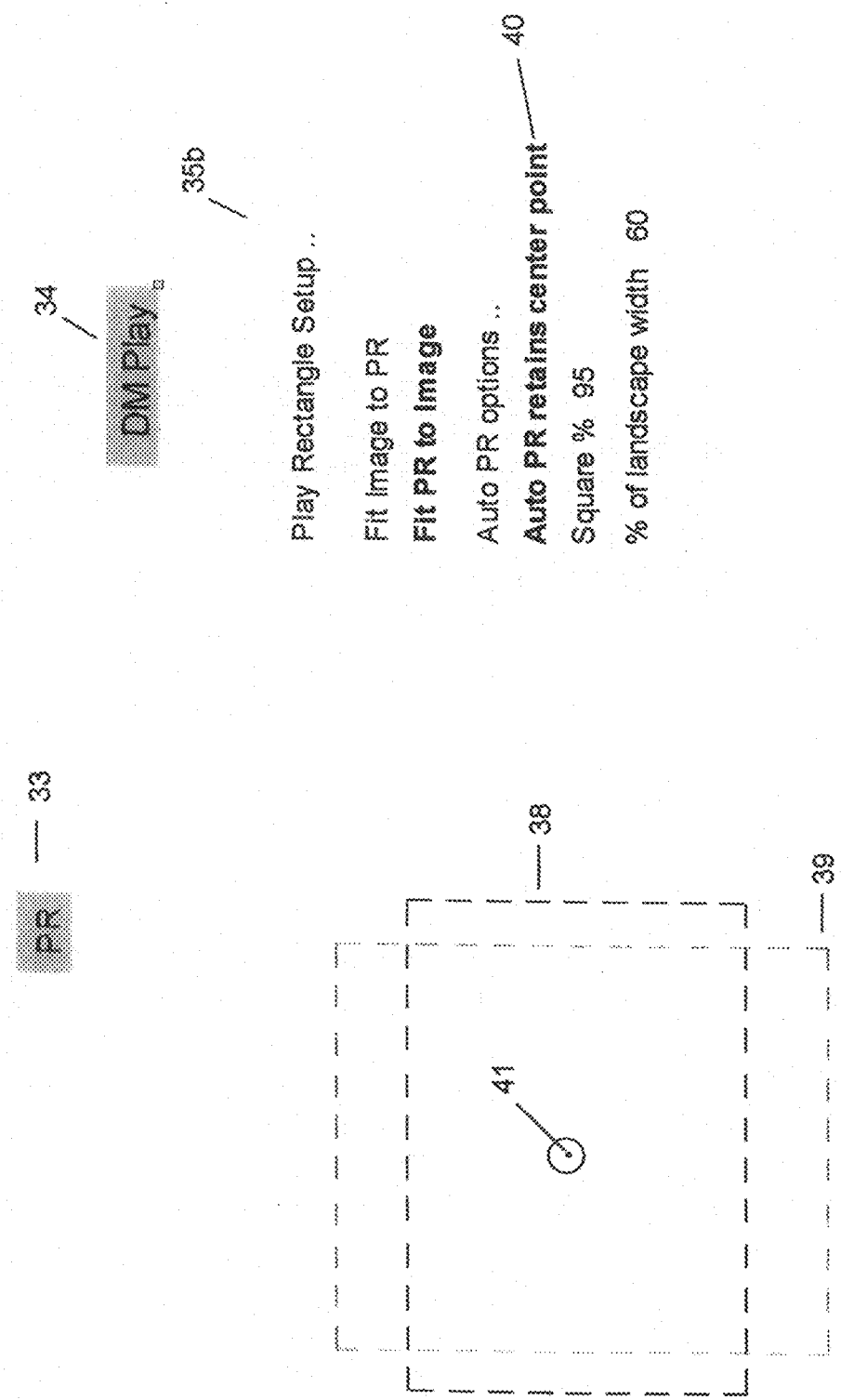
FIG. 15 shows the alignment of images' center point to the center point of a PR as they are played back within a PR in a slide show.

When the entry "Auto PR retains center point" 40 is activated, as shown in FIG. 15, the images playing back in the slide show align their center points to the center point 41 of the PR. That is, landscape images 38 and portrait images 39 are aligned to the center point 41 of the PR. Note: all of the images in the slide show can be of a different size. It doesn't matter. Whatever size the images are, the PR's dimensions will be automatically adjusted to match them when they become the currently playing image in the slide show.

2. Square %.

Figure 16:
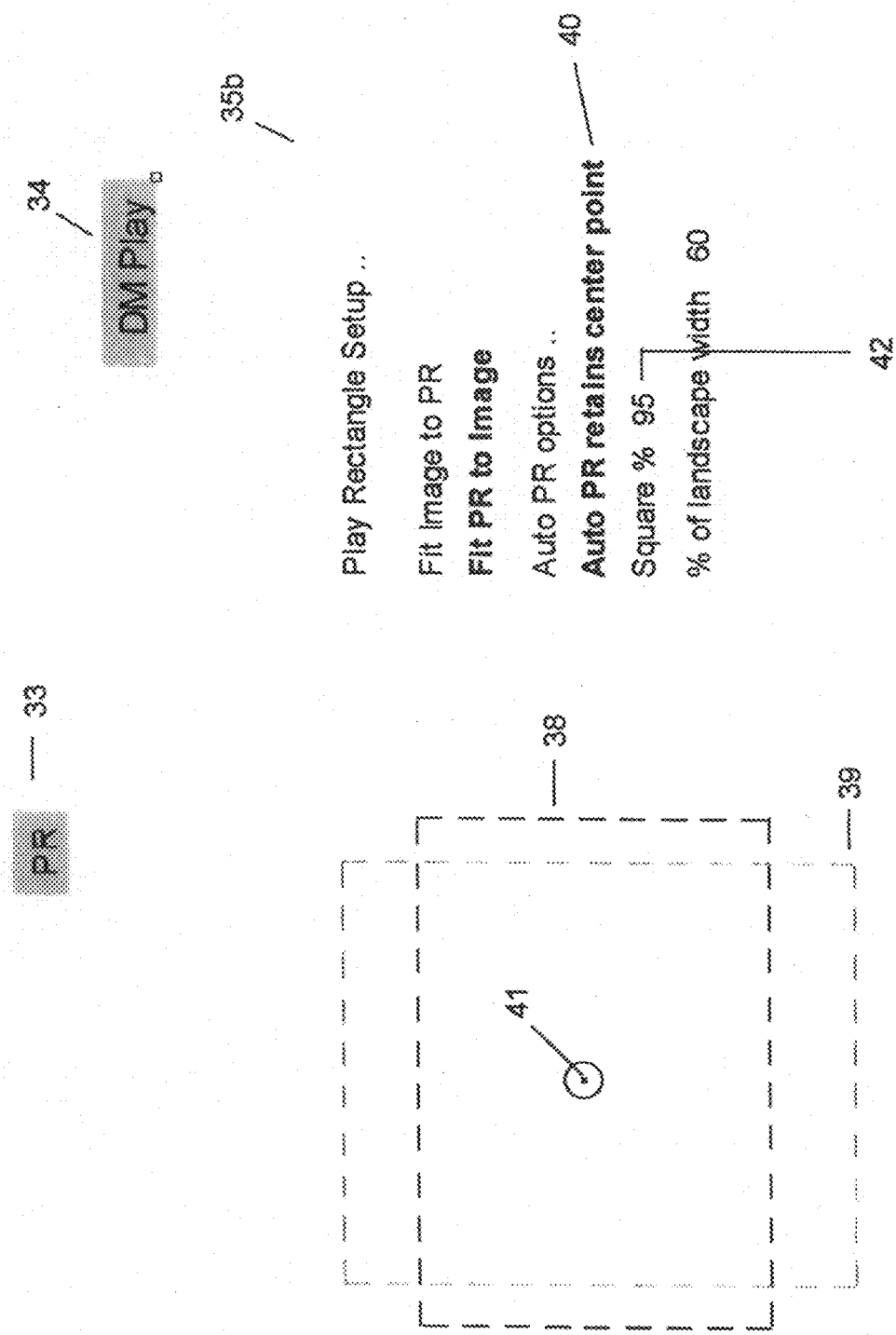
FIG. 16 refers to the entry Square %" and its use with a PR in a slide show.

Referring to FIG. 16, "% square 95" 42 is a user-defined control to determine what shall define a "square" image. Ideally, a square image is an image that has four equal sides. The Info Canvas entry 42 enables a user to change this classical definition of a square to something that is not an ideal square. The number at the end of entry 42 can be changed to anything from 0 to 100. Zero would mean that any object would be a square and 100 would mean that only an object that had four perfectly equal sides would be a square. Typing a "95" for this parameter means that any object whose sides are within 95% of the length of each other would be considered to be a square. This feature exists because many photos that appear to be square do not have perfectly matching sides. The PR is designed to change its shape to landscape, portrait and square overall shapes.

3. % of Landscape Width.

Figure 17:
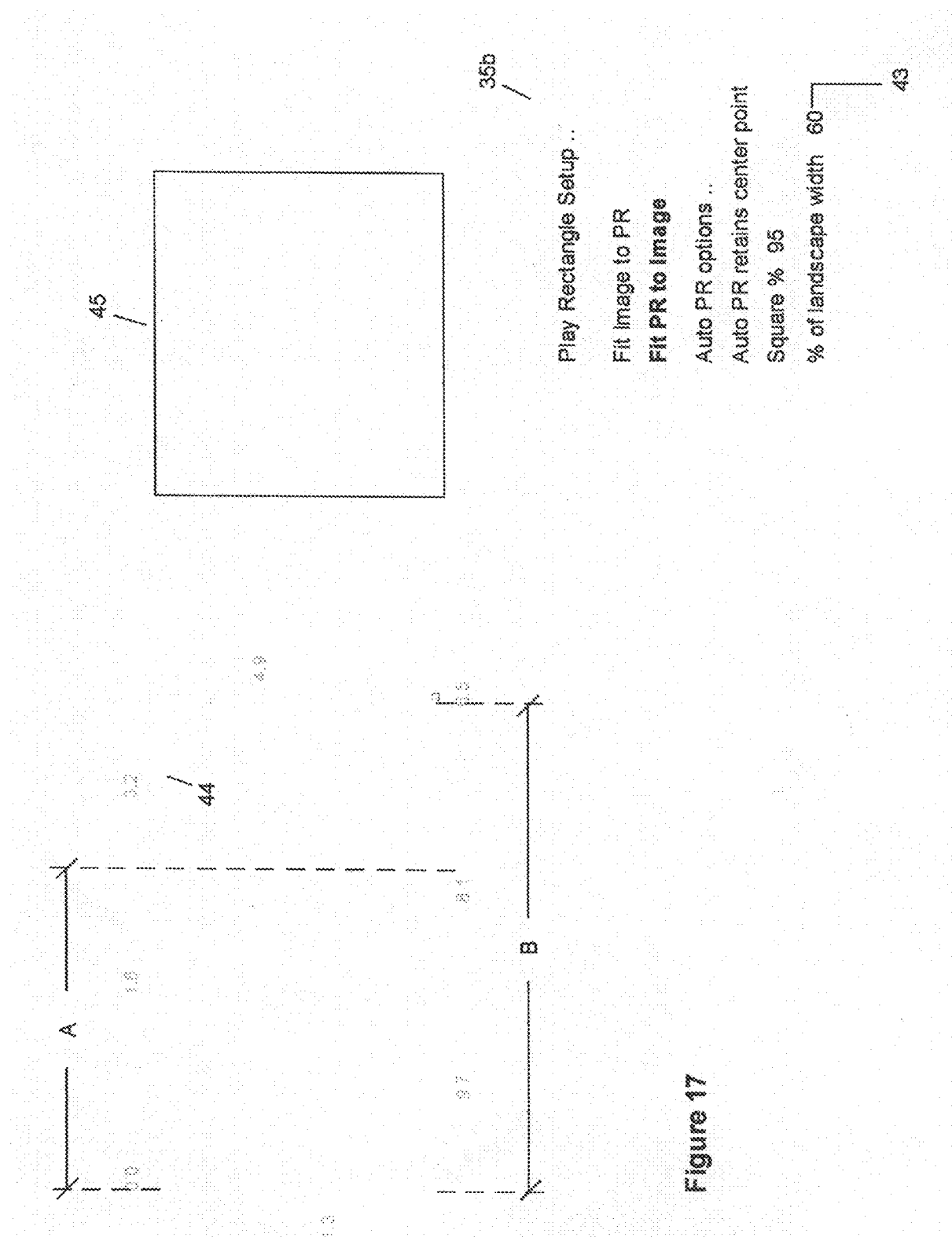
FIG. 17 illustrates how the definition of a square is calculated from the entry "% of landscape width."

Referring to FIG. 17, the entry "% of landscape width" 43 in the Info Canvas object 35b is the last setting for determining what a square is in a slide show. This function exists because if a square image matches the length of each of its sides to a distance that equals the length 44 of the PR, square images in the slide show will be quite large, certainly they will feel larger than either the landscape or portrait images.

On the contrary, if a square image sets the length of each of its sides to a distance that equals the height of the PR 37, square images in the slide show will appear much smaller than the other images. The solution is to enable users to determine what the length of all square images will be in their slide show when the user has activated the "Fit Image to PR" mode. Using a factor of 60% for the "% of landscape width" 43 means that the length of each side of a square will equal 60% of the length of the PR's landscape length. Notice that the entry "% of landscape width" 43 is followed by a numeral. In FIG. 17, this is the number "60". Distance A in FIG. 17 is approximately 60% of distance B, which results in a square 45 from this calculation. To change this percentage, a user need only place a text cursor next to "60" and type a new number.

A description of the GUI procedure is now described. As used herein, the term "software" refers to a program that is configured to perform operations in a computer system. In implementation, these programs may be any combination of software, firmware and/or hardware.

User Drawn Blue Arrow which Intersects Objects Onscreen

Intersections are determined by "collisions" in the drawing space, i.e., the global drawing surface of the Blackspace environment.

The Blackspace program asks the drawing surface for a list of things that collide in a drawing sense with the objects that it's inquiring about. Then it gets a list of objects back from the drawing surface. This list includes the things that collide with the object in question or collide with a certain point on the drawing surface. This is the method for working out what a drawn arrow is intersecting. This same method is used for anything that involves making decisions based on the fact that two things intersect each other.

The software analyzes all objects which overlap each other in any way on the drawing surface to provide a collision list. Objects which are hidden do not collide but objects which are visible but clipped into a VDACC object do collide but can be mapped out of the collision list if required. This normally is the case.

The collision list contains nothing which is set to be hidden. There are things that come back from the basic drawing software that are not visible because they are clipped. For instance, if an object or objects are placed into a VDACC object and then these objects are scrolled up so that they are above the top edge of the VDACC object (they are above the visible area of the VDACC object), then these objects are no longer visible. This is because they are automatically hidden when they scroll outside any perimeter of a VDACC object into which they are clipped.

If a user clicks in this area with the mouse or its equivalent, this mouse click will not collide with these objects.

The drawing software decides if an object is completely hidden or partially hidden by virtue of the fact that it is clipped into a VDACC object, and if this is the case, this object is removed from the list of colliding objects. The point here is that collisions must not take place with objects that the user can't see. Otherwise, the user will not be able to control what the user is doing in the Blackspace environment.

The reason this work needs to be done is because the collision list includes these objects that are hidden to the user. So these objects need to be mapped out of the collision list.

The list of objects which collide with the arrow is sorted according to the nearest point in the list of points in the arrow's tail.

When the arrow is drawn by the drawing surface, the arrow is drawn using a list of points that make up the line that becomes the tail of the arrow. The way to sort the objects that are colliding into the right order is by seeing what the nearest point in the arrow tail is.

The list of colliding objects is a list in no particular order. Collisions are defined as objects that graphically collide with the arrow tail. This list is asked for by the software manager of the drawing surface. The drawing software is software that contains the lowest level of drawing objects.

At this point the list of collisions is stored in the arrow object itself. So the arrow object keeps a list of all the objects with which it collides. Furthermore, the arrow object keeps two additional lists: (1) a source list—the objects that its tail (arrow shaft) collides with, and (2) a target list—the objects that its head or tip collides with.

Analyze where the Arrow Starts and what it is Pointing at

The arrow provides a collision region at the tip of it's tail and another extending a short distance in front of its head.

A region is designated at the tip and tail of an arrow that enables a user to draw that arrow such that it doesn't have to actually intersect an object in order to collide with it. If an object is within this collision region, it is determined that the arrow collides with it. A default for this collision region is approximately 20-30 pixels. This is a user definable parameter which can be changed by making a selection in the Info Canvas object for the arrow being drawn.

Regarding the shaft of the arrow (the drawn line of the arrow), intersections are made just with the line itself. Although a collision region could extend along the length of a drawn arrow's shaft, this would in general decrease the accuracy of the drawing of an arrow for the purpose of selecting items with its shaft. Therefore, there is no collision region along the shaft of a drawn arrow. This shaft (line) must itself intersect an object to create a valid collision with it.

This is important when a user draws an arrow such that it intersects only certain items in a list of graphic objects, e.g., photos, in a VDACC object. What is desired here is that what is visually presented to the user matches what actually happens with regards to collisions with the arrow's shaft. So, if the arrow shaft intersects the tiniest part of a letter that is part of the name of a photo, for instance, that photo will be selected. And, if the shaft just misses the letter, then this entry (this photo) will not be selected. In the case of a slide show, this means that this photo will not be added to the list of images that will play back in the slide show.

The regions at the tip of the tail and the head of an arrow are there to enable a user to more easily select items right where the arrow starts to be drawn and right where the arrow ends. This collision area is valuable here.

These regions obtain their own collision list and determine the "prime source" at the tail and the "target" at the head.

As previously mentioned, there are two collision lists maintained in an arrow object when it is first drawn: (1) a tail ("prime source" collision list, and (2) a head (tip) "target" collision list. Both of these lists are part of the definition of the arrow object.

The prime source and the target are determined as the objects with the highest z-level in these two collision lists.

If the target collision list for an arrow contains more than one object, then one of these objects must be chosen to be the target. The object that is chosen is the object that has the highest layer level, what is referred to as the highest Z-level.

For example, let's say an arrow is drawn so that it points to an object that is in a VDACC object. In this case, the target would contain the object that is intersected by the arrow and the VDACC object itself. Any object sitting in (on) a VDACC object has a higher Z-level than the VDACC object, so the sitting object would be selected as the target for the arrow. If the arrow tip is on the VDACC object and does not intersect any object on the VDACC object, then the VDACC object will become the target for the arrow. If an arrow is drawn to a group of objects that are on top of each other, the arrow selects that object in this group that has the highest Z-level and this becomes its target.

Remove Invalid Objects from the List of Intersected Objects

Below are examples of things which are invalid objects.

Invalid Objects:

VDACC objects which contain the prime source or the target.

The way VDACC objects work is they enable arrows to be drawn across their perimeter lines without selecting them. Also an arrow can be drawn across the perimeter lines of VDACC objects to intersect other objects at the tail, and not select the VDACC objects themselves. This is a necessary operation for the blue arrow. Users can draw the shaft of the blue arrow to intersect any one or more picture files in a VDACC picture file list and then draw the arrow across a perimeter line of the VDACC object and point it to the global drawing surface of the Blackspace environment. The blue arrow only selects what it intersects, except for the VDACC object, which it does not select.

Parts of the arrow or the original line used to draw the arrow.

VDACC object which contains any of the intersected objects.

What is referred to as the Picture File VDACC object, which contains the names of all of the slide show images that may be selected by the blue arrow to create the slide show. The blue arrow is used to insert new pictures into the slide show. This method involves drawing the shaft of the arrow across the perimeter of the Picture File VDACC object. When this is done, the Picture File VDACC object is not selected by the arrow.

Create an "Incomplete" Arrow Logic Using the Passed List of Objects

When an arrow whose color matches a known arrow logic is drawn, it has what is referred to as an incomplete arrow logic. When such an arrow is drawn between one or more objects that are considered valid for that arrow logic, the head of the arrow turns white (any graphic can be used here, e.g., a blinking arrow, flashed arrowhead, etc.). At this point in time this arrow has an incomplete arrow logic. Then when a user left-clicks (or its equivalent) on this white arrowhead, the arrow logic for this arrow becomes complete.

Regarding the term "passed list of objects", this list is passed from the arrow object to the arrow logic. At this point the arrow logic is saved in memory. The arrow object has collected data from its source and target collision lists. The arrow logic determines which objects are invalid and which are valid and then passes these lists to the arrow logic.

The arrow logic is a purely software object which exists in memory. Arrow logics are created as temporary files in memory and are used to effect the operation the user is trying to create by drawing of an arrow between two or more objects on the drawing surface. When these logics are used, the arrow is discarded and the logic remains in effect in the system software until the original link or links that were established between one or more objects, by the drawing of this arrow, are removed.

The arrow logic defines operations and it contains a list of objects on which those operations are performed. An arrow logic is a list of sources and targets and the logic has a type which is worked out from the color that was used to draw the arrow and then when things happen on source objects they communicate with the arrow logic which they know they belong to and call methods on the target objects via the arrow logic.

The "type" of an arrow logic is the action or function that will be carried out when the logic is complete. There are many different types of arrow logics and each logic can be assigned to a different color so a user can easily tell them apart. Let's say for instance, a user draws a red arrow and that this color assigned a "control logic" to the drawn arrow. This control logic can be stated as a sentence as follows: "what the arrow is drawn from (what objects the arrow intersects at its source) controls what the arrow points to (the objects that are arrow's target)."

The "things" that happen as a result of completing an arrow logic are dependent upon the type of arrow logic completed. For instance, if a "control arrow logic" was used between a source fader and two target faders, the "thing" that happens is that as the cap of the source fader is moved, the fader caps on the target faders will move with it, because they are controlled by the source fader.

In the case of a slide show, the blue arrow has a different logic. This arrow logic takes the items that are collided by the drawing of the arrow's tail and causes the following things to happen when the tip of this blue arrow is drawn to point to the blank global drawing surface of the Blackspace environment.

Each of the intersected items is placed into its own small VDACC object of a predetermined size, which can be user-defined and altered.

Each of the small VDACC objects is placed into one larger VDACC object where the smaller VDACC objects are arranged in horizontal rows of 8 small VDACC objects each.

Each of these source items is assigned a start time and a duration time.

Each start time for each item is delayed later than the previous item by a time that equals the duration of the previous item.

All of the source items can be played back in sequential order whereas the VDACC object that contains each of these items is not played back, only the item itself.

The blue arrow logic is a sequential logic. It's not limited to images, like photos. It can also be used to play back graphic devices, like faders, switches, knobs, joysticks and the like in sequential order. It can also be used to do the same with text objects, etc.

An arrow logic linker contains a list of its source controls and a target control.

For example, if an arrow is drawn through a group of photos, the arrow logic linker knows that a list of photos has been intersected as a source, and if the arrow is pointing to the Blackspace global drawing surface, there is no target control.

The arrow logic provides a vehicle for objects in the arrow logic to communicate with each other. This is not required in this case.

An example of this is what has already been cited. It would be the drawing of an arrow from one fader to another. This creates an arrow logic which transmits value changes from one fader to another fader.

In the case of creating a slide show, this is not relevant. These objects are not being asked to send messages to each other. So the drawing of a blue arrow is not requesting the images selected at the arrow source to send messages to the Blackspace global drawing surface, which is what the tip of the arrow selects when this type of arrow is first drawn.

A flag is set which permits the arrow logic to be discarded once it has been processed.

Once the arrow logic is processed, it's no longer needed. This is after the white arrowhead has been touched and the logic has effected its operations, performed its assigned tasks.

On the processing of an arrow logic, the arrow logic has in part taken all of the images that were created by the result of the arrow being drawn to intersect text that represents these images, then created a small VDACC object for each of these images and then placed each image into one of these VDACC objects, and then created a Dyomation session, etc. until it is finished. Then there's no further need for that arrow logic. For more information on Dyomation (previously referred to as "Drawmation") operations, in general, see pending U.S. patent application, entitled "System and Method for Recording and Replaying Property Changes on Graphic Elements in a Computer Environment", filed on Sep. 26, 2003, which is specifically incorporated by reference herein.

The processing of the arrow logic takes place after the white arrowhead of the drawn arrow that initiates this logic has been touched (left-clicked on or its equivalent). All of the above described work which is done by the arrow logic is a result of touching the white arrowhead on the drawn arrow. In summary, when an arrow logic has performed its assigned tasks, it is discarded unless it is required to be retained as a functional link.

The result of the above described arrow logic performing its assigned tasks is a Dyomation session with some specific behavior attached to it. With regards to a slide show, the arrow logic creates the sequential order of the slide show elements (the source objects for the originally drawn blue arrow) and its job is done.

A flag is also set to indicate that the drawn arrow can be discarded once the arrow logic has been processed.

The discarding of the drawn arrow results in the arrow disappearing once its white arrow head is left-clicked on by a user.

In this case, it is valid for the arrow logic to have no target if it was drawn pointing to raw Blackspace global drawing surface.

Slide shows are created using a special arrow logic that is not a slide show logic. A slide show is just one use of this arrow logic. The arrow logic operates by drawing the shaft of an arrow to intersect various media and then the target of this arrow is the Blackspace global drawing surface. In fact, the arrowhead must point to the blank Blackspace global drawing surface in order for this logic to be valid.

There is an exception to this in that once a slide show is created, you can draw the same blue arrow to the Slide Show VDACC object to insert more slides.

This logic is assigned as a default to the color blue. The assignment of colors to arrows is a user controllable function. See pending U.S. patent application Ser. No. 09/880,397.

The logic that is used to create slide shows reads as follows: "The objects that the arrow is drawn from (that the arrow either intersects and/or encircles) are each placed into its own VDACC object, assigned a default onscreen time, and then assigned a sequential order which is the order that they are played back. This is the order that they were intersected or selected by the drawing of a blue arrow (or another colored arrow that has this logic assigned to it)."

One might think of this particular arrow logic as a "sequential" logic. All types of media can be intersected or encircled with this arrow and caused to play in sequential order. These media include: pictures (photos), text, recognized graphic objects, free drawn lines, graphic devices (e.g., faders, switches and knobs and joysticks), video, animation (like Dyomation sessions), documents, glued conglomerates (glued groups of items), VDACC objects with or without objects within them, and the like.

This sequential arrow logic is not limited to picture files, e.g., .png, .jpeg, .gif, .bmp, etc. Graphic objects, like stars, folders, circles, etc., can be sequentially presented with this blue arrow logic. Any number of text objects typed in the Blackspace global drawing surface or in a VDACC object can be presented sequentially with this arrow logic.

If the user clicks on the arrowhead, the arrow logic data is passed to the slide show manager. Clicking on the head of a blue arrow (where the arrow head has turned white) is the last step in causing the items intersected by this drawn arrow to be sequentially placed into VDACC objects ready to be played back in their sequential order.

A description of a process to a slide show from an arrow logic is now described.

1. Test that the arrow logic is of the correct type. The slide show manager makes this test. When an arrow is drawn, the color of the arrow is translated into an arrow type, which is performed before this step. By this time, color is not part of the equation any more.

2. Create a small VDACC object and make enough copies of this VDACC object to hold all the items in the arrow logic source list. This step creates a VDACC object for each item that exists in the arrow logic's source list for the arrow that was drawn in the Blackspace environment.

3. Examine each object in the source list. This source list is from the arrow logic. The source list is generated by the object that the arrow intersects with its shaft.

If the object is a text object representing a disk file, then send a request to the file management system to create an object from the file. This is most appropriate for files representing pictures. A picture file (photo file) can be represented as a text file in a VDACC object for instance. An arrow can be drawn to intersect various text files in this VDACC object. These text files can represent image files stored somewhere, e.g., on a hard drive, CD or other storage medium. A flag is set to say that the slide show manager is waiting for content to be returned. In other words, a request is sent out to get a picture (photo) from a file name on the source list. The picture is returned by the file system to the GUI software. When this object is returned by the file management system it follows the procedure below.

The following procedure is performed when the graphic object is returned.

If it's any other text object, it is resized so that it has the appearance of being approximately 12 point in size.

If it's any other kind of graphic object it is resized to the size of the small VDACC object.

Each object is processed like this is placed into one of the small VDACC objects. At the same time, it is locked to the surface of the VDACC object. Each of these VDACC objects is now treated as a slide.

4. As each object is placed into its small VDACC object, the VDACC object is assigned a start time and a duration based on settings stored in the slide show object. The slide show object is the software construct, the slide show management software, which is managing this process. This slide show management software has a list of the start times, end times and duration times for each item that has been placed into a small VDACC object.

The user controls these settings via entries in the slide show category entry, which is part of the Info Canvas object of the DM play switch. The start time stored is cumulative based on the calculated end time of the previous slide. In other words, each new slide's start time is at a time that equals all of the previous slides before it added together. As each object is assigned a time, a text object is created which is "connected" to the slide. The "slide" is a small VDACC object with an image in it. The text object that is added shows the duration time for the slide. This text object is generally placed above the slide, but it could be placed anywhere. When the user edits this text object, the duration of the slide is altered accordingly. See "Changing the onscreen time of one or more slide show images" described above.

5. When all the content has been acquired as above, the slides are ordered and placed into the slide show VDACC object. The size and position of this slide show VDACC object are calculated to show horizontal rows of eight slides, which is the default for the software. However, the slides could be organized in many different arrangements. This arrangement is then shown to the user. The word "content" here refers to all of the individual items that comprise the slide show, including the requests that have been sent to the file system to get pictures from it.

6. Create a Dyomation session.

A request is sent to the Dyomation manager to create a session long enough to include all the slides. This session generally equals the length of the sum of all the duration times for all of the slides in the session.

A Dyomation event to show and hide each slide is sent to the Dyomation manager. Each slide is set to have a "hide" event, which is 1 ms later than the "show" event for the next slide. This is so that the user perceives no gaps between adjacent slides. There is an event assigned to each of the small VDACC objects in the slide show to have the item assigned to it to show (be visible) for the duration of time that is set by its text object and then hide it for the rest of the duration of the slide show. There are two events here, a show event and a hide event that are created for each slide. The hide event for each slide equals the start time of that slide plus its duration.

7. Although the slide show management software keeps notes of the times for various features, in order that they can be edited, saved, etc., it is now the Dyomation manager which is the holder of the authoritative information.

In other words, what happens when a user activates the Dyomation play switch to play the slide show is entirely under the control of the Dyomation manager, not the slide show manager.

Figure 18:
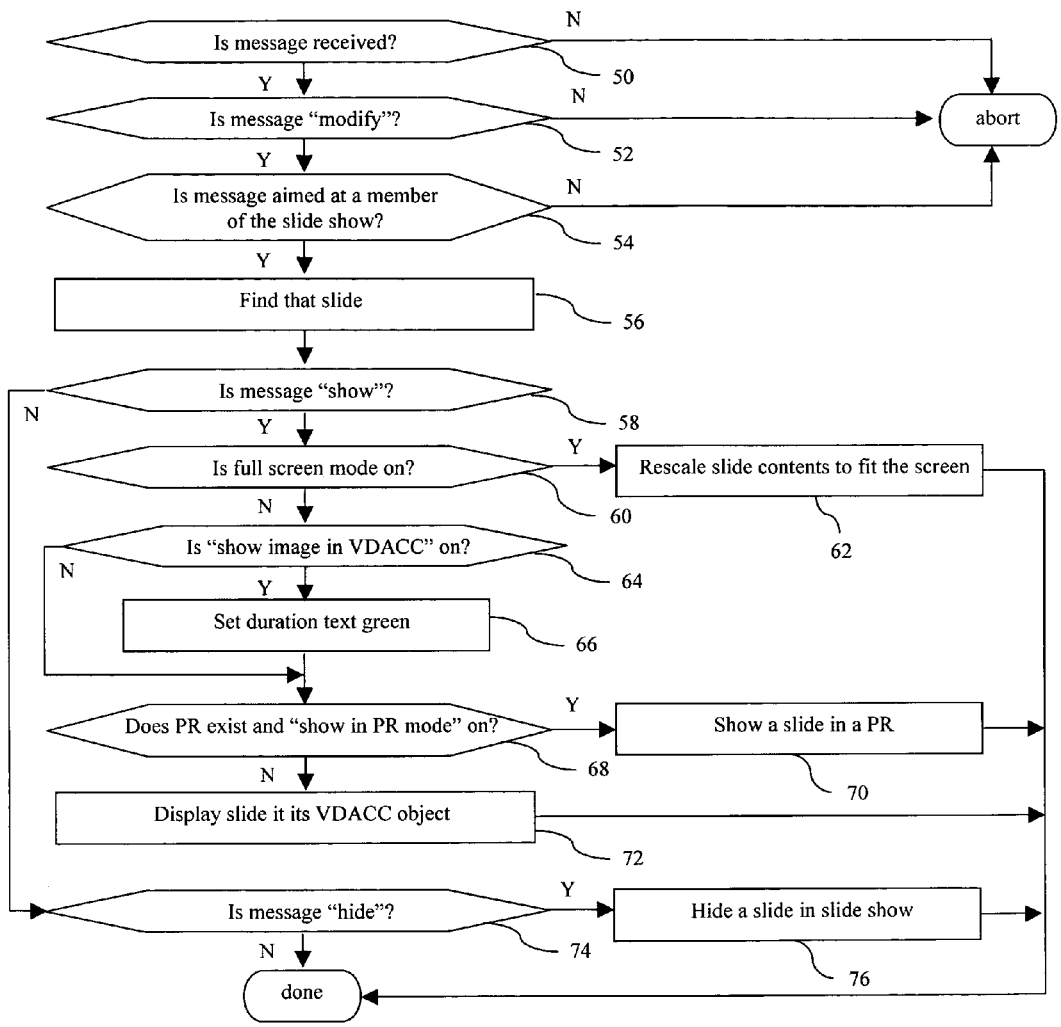
FIG. 18 is a flow chart for playing a slide show.

Turning now to FIG. 18, a flow chart for playing a slide show is shown. All real time behavior is controlled by the Dyomation manager. Real time behavior means the real time manipulation of graphics on the drawing surface. Dyomation manager works by sending out event messages, and the timing of these messages is the responsibility of Dyomation manager, not the slide show manager.

When a user does anything graphically in the Blackspace environment (on the computer screen), this is recorded by maintaining a record of all the event messages associated with those actions. These event messages are managed by the Dyomation manager. In the case of a slide show, the event messages are created partially by the arrow logic which creates the sequential order of the items and places them in VDACC objects, combined with any inserts or edits that a user would add to the slide show subsequent to its initial creation by the drawing of the arrow. The slide show provides its own features by intercepting messages coming from the Dyomation manager to the GUI. Most of these are "show" and "hide" messages.

Intercepting messages is a basis for the slide show manager. What the slide show manager does is intercept messages that it understands. What it does in a Dyomation session is to send a set of show and hide messages and have those replayed. When the Dyomation manager normally sends a show message, that message has a defined behavior. It causes an object to become visible and that's the point.

But the slide show object requires a more complex behavior. So the slide show manager intercepts this message and doesn't just show the item, the slide show manager modifies the item according to features controlled by the slide show manager. This is what this flow chart shows.

Is a message received? 50. This is a message from the Dyomation manager. The Dyomation manager is sending the message to the GUI management software. The reason the Dyomation manager is sending it is because that message's time has arrived. An example of this would be this. There is an image in one of the small VDACC objects in the slide show VDACC object. The start time of this image equals the current time of the playback. Because it's start time equals the current time, a message is sent to the GUI management software to say show this image. The image that just finished playing has a message that is sent to the GUI management software that says "hide me."

The Dyomation manager doesn't know anything about slide shows. It's just sending out messages. The Dyomation manager is the system for having the Blackspace program play things in real time. It does this by sending messages to the GUI management software to tell the GUI management software what to do. When a slide show is created, a set of messages is artificially inserted which is simplified to the extent that the messages are just a show message and a hide message. When these messages are played back, the slide show recognized that they are either a show or a hide message for one of its members and stops that message from going straight to the object and applies various behaviors to that message through the slide show manager.

The slide show manager acts as a monitor on the Dyomation messages and invokes a special behavior if the message fulfills certain criteria.

When a user is playing back a Dyomation session, it contains a list of events which it is sending out when the right time arrives for that event to happen. Creating a slide show artificially creates a series of events for the objects that the slide show is managing.

When those events are played back by the Dyomation manager, the slide show manager recognizes that that event is one that it created. This causes the slide show behavior to be invoked for that event, as opposed to passing it straight to the GUI management software.

Then, is message "modify"? 52. What kind of message is this? Is this a "modify" message? There are various message types in a Dyomation session. This is one of the message types.

Then, is message aimed at a member of the slide show? 54. In other words, is the message aimed at one of the graphical elements that is under the control of the slide show manager? If the answer to any of these first three questions is "no", the software aborts.

Then find that slide 56. The software finds the image that is currently being played. This means find the small VDACC object with a certain start time and duration time. The message is not recognized by virtue of the time. It is recognized by virtue of the ID for that slide. The slide show manager has a list of IDs for the objects that make up the slide show. So it recognizes that this message is being sent to the ID of one of its objects (which could contain an image, a text object, a graphic device or other type of graphic object).

Every object in the system has an ID. Not just graphic objects, but also system objects and software objects have unique ID s. So the slide show can know which objects belong to it just by looking at the ID for each of those objects. At this point the slide show manager doesn't need to know about time.

The Dyomation manager sends a message to the GUI management software saying: "Show an object with this ID." There are no times in this message. The slide show manager looks at the ID of an object and if this ID is in the slide show manager list, then it says "this is one of mine."

The ID of the object in the message will identify one of the slides. The slide show manager "finds that slide" using the ID in its list. So the slide show manager knows that there is a message. It knows that the message is aimed at a member of its slide show, which is a slide. And it knows that in that message is the ID so it can find the slide based on the ID in the message.

Then, is message "show"? 58. One of the modify messages is "modify visibility". This is saying, is this a show message, namely, make visible?

If no, then is message "hide"? 74. If no, the process is done. If yes, then hide a slide in slide show 76.

If yes at block 58, then is full screen mode on? 60. If yes, then rescale slide contents to fit the screen 62, and the process is done.

If no, then is "show image in VDACC object" ON? 64. If yes, then set duration text green 66. If no, then proceed to block 68.

When an image in the Slide Show VDACC object is on (it is the image that is currently playing), the duration text (what is referred to as the onscreen time parameter) for that image turns green. Normally this parameter would be white. The onscreen time parameter is the number above the image in the Slide Show VDACC object. This parameter determines how long the image will remain onscreen in the slide show. This text turns green to show the user that this is the current slide that is being played in the slide show.

Does PR exist and "show in PR mode" on? 68. The software checks to see if the Play Rectangle exists. Now this doesn't necessarily mean that the PR is itself visible. In fact the PR may be invisible, but its effect will be visible. Its control will be visible.

When a slide show has been created, turning on a PR switch causes the images being played back in the slide show to play back such that each image is automatically resized to fill the inside area of a PR. When the "show in PR mode" is turned on, then the PR itself can be turned off. This is achieved by creating and placing a new VDACC object which fits inside the dimensions of the Play Rectangle. This is described in more detail below.

There is no question that the PR still exists because the slide show image remains resized according to the size of the PR that was just visible onscreen. The PR still governs the size of each slide show image during playback even though it becomes invisible when the PR switch is turned off.

Turning the PR switch off is a logical thing to do, as it permits the slide show images to playback as images in the Blackspace environment without anything added around their perimeter. This is, of course, exactly what the PR appears to do when it is visible. It adds the PR timeline around the perimeter of each image in the slide show.

If yes, then show a slide in a PR 70 and the process is done. If no, then display slide in its VDACC object 72 and the process is done. If the item is already present in its small VDACC object, there is nothing to do here. But if is not visible onscreen, the image is resized to fit back into its VDACC object.

Figure 19:
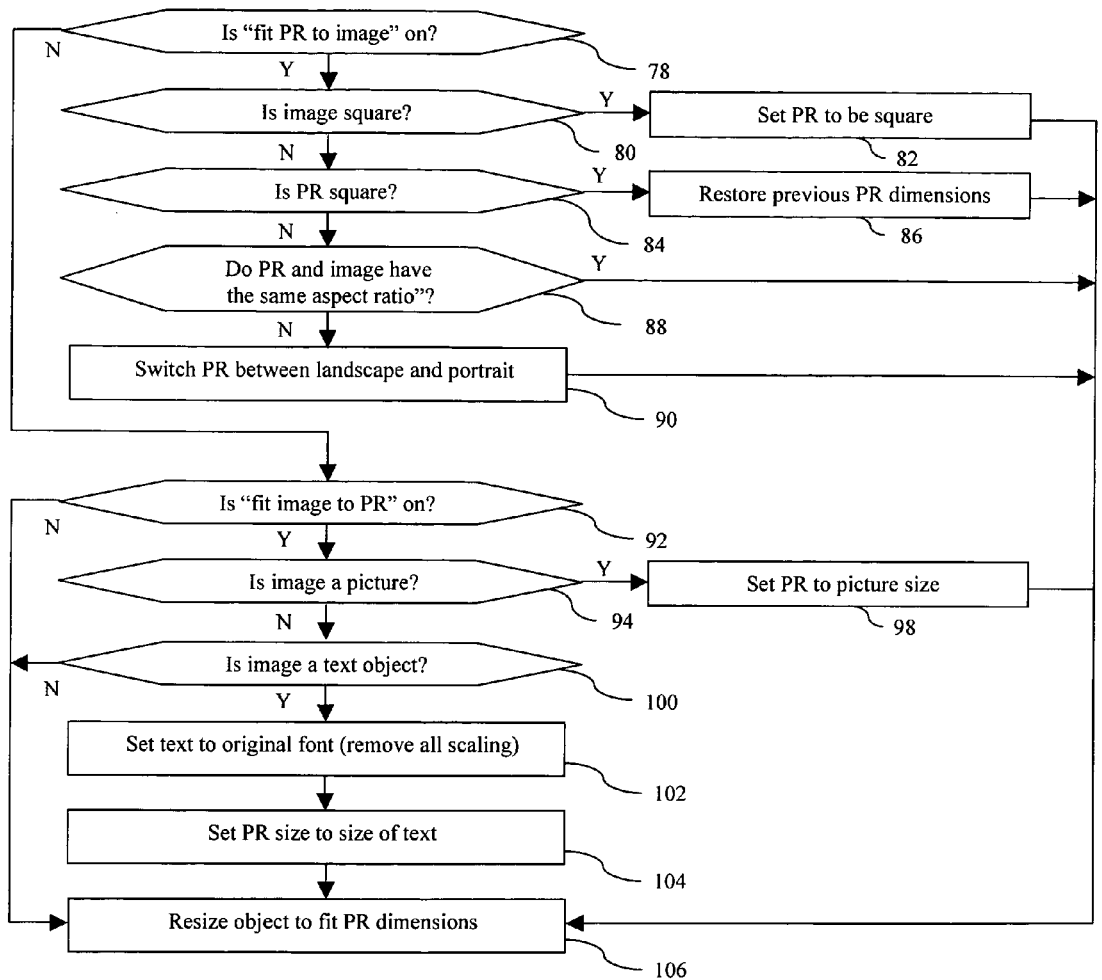
FIG. 19 is a flow chart for showing a slide in a Play Rectangle (PR).

Turning now to FIG. 19, a flow chart for showing a slide in a Play Rectangle is shown. This process corresponds to the "show a slide in a PR" processing block 70 of FIG. 18. Is "fit PR to image" on? 78. This entry is found in the DM Play switch's Info Canvas object under the category "Slide Show." Fit PR to image means adjust the aspect ratio of the PR to match that of the primary object in the slide. The overall size of the PR remains the same.

If no, then proceed to block 92. If yes, then is image square? 80. If yes, then set PR to be square 82. The process then proceeds to resize object to fit PR dimensions 106.

If image is not a square, then is PR square? 84. If yes, restore previous PR dimension 86. The process then proceeds to block 106.

If when playing a slide show one image is square and then the next image is not square, the square shape of the PR needs to be undone.

If the PR is not a square, then do PR and image have the same aspect ratio? 88.

If yes, then resize object to fit PR dimensions 106 and the process is done. If no, then switch PR between landscape and portrait 90. Then resize object to fit PR dimensions 106.

Referring back to block 78, if no, then is "fit image to PR" on? 92. If yes, then is image a picture? 94. If yes, then set PR size to picture size 98 and then resize object to fit PR dimensions 106.

If no, then is image a text object? 100.

If yes, then set text to original font size (remove all scaling) 102. Then set PR size to size of text 104 and then resize object to fit PR dimensions 106. If image is not a text object, then resize object to fit PR dimensions 106.

Fit image to PR is also found in the DM Play switch's Info Canvas object under the category "Slide Show". Fit image to PR means that each image in the slide show has its geometry changed to match the dimensions of the Play Rectangle. These dimensions can be changed by the user at any time, even while the slide show is playing back. If neither "Fit PR to image" or "Fit image to PR" are set on, then the size and shape of the PR is unaffected by slide contents.

To accomplish this, the user left-clicks on the resize button of the Play Rectangle, located in its lower right corner, and drags in any direction. As the Play Rectangle's dimensions are changed, the slide show PR VDACC object shown inside the Play Rectangle is changed to match the new dimensions. Furthermore, when this change occurs for the image in the Play Rectangle, this change is automatically applied to each and every subsequent image which plays back in the slide show, until the dimensions of the Play Rectangle are changed again. In each case, the new dimensions for the Play Rectangle will govern the dimensions of every image that plays back in the slide show from that moment on.

Regarding the step "set text to original font size (remove all scaling) 102", the slide show manager is not limited to playing back images (pictures) as slides. It can also play back text typed on the drawing surface. In the Blackspace environment, typed text is itself an object. Each time a user places a text cursor and types text, a text object is created. So multiple text objects can be created and used as a source list by intersecting them with a drawn blue arrow (or its equivalent). Then these text objects will play back in a slide show just as picture files, e.g., .png, .jpeg, .bmp, .gif, etc., can be played back in a slide show.

Additionally, recognized objects and graphic devices can be made to play back as slides. The method of their playback is the same as that for images and text objects.

Figure 20:
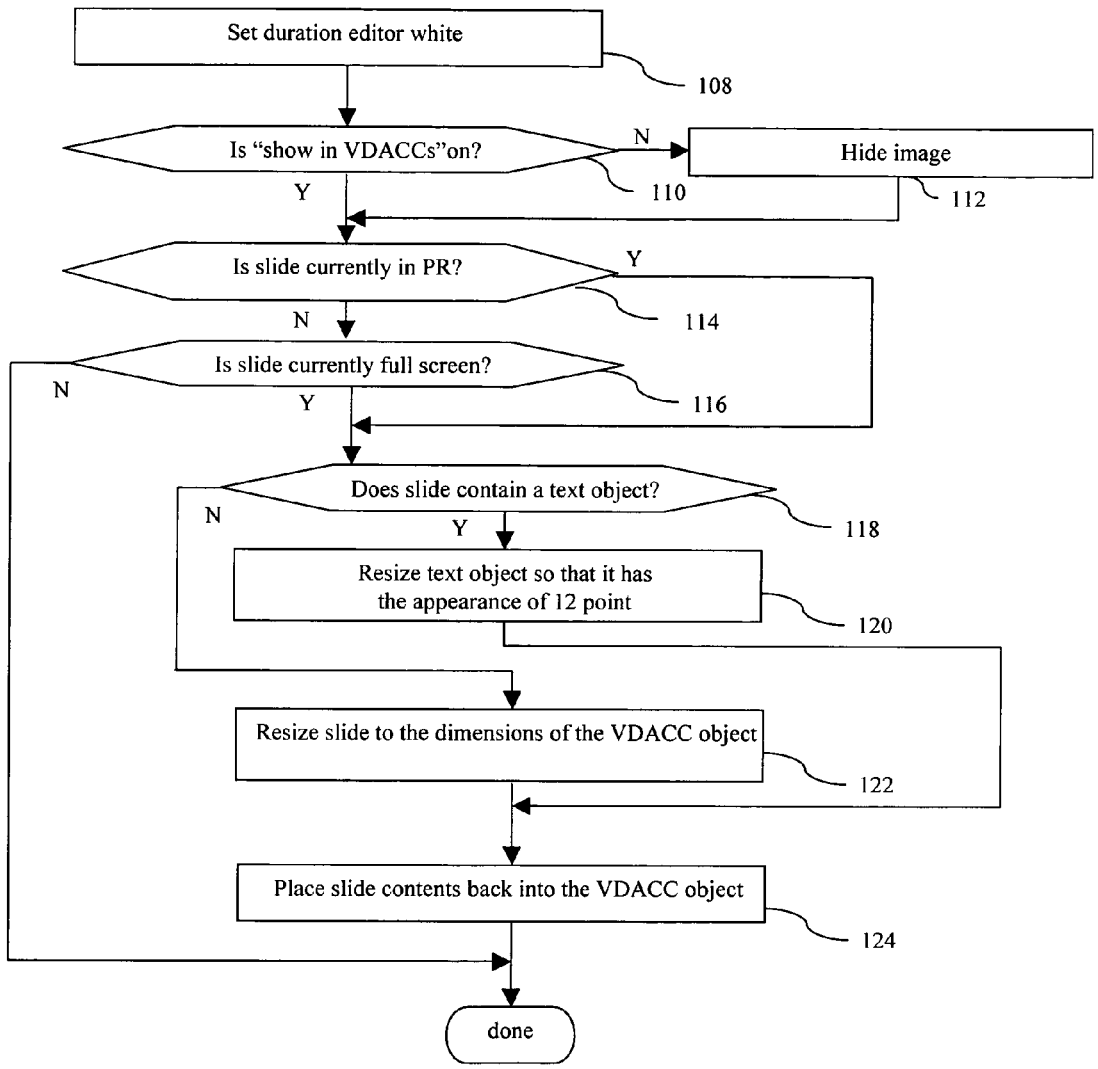
FIG. 20 is a flow chart for hiding a slide in a slide show.

Turning now to FIG. 20, a flow chart for hiding a slide in a slide show is shown. Set duration editor white 108. The duration editor is a small text parameter that appears above each small VDACC object which contains each image in the slide show. The default time for this duration editor is 5.000 seconds.

Then is "show in VDACCs" on? 110. This is turned on by activating the entry "Show images in VDACCs" which is found in the Info Canvas object for the DM Play switch under the category "Slide Show."

If no, then hide image 112 and proceed to block 114. If yes, then is slide currently in PR 114.

If yes, then does slide contain a text object? 118

If no, then resize slide to the dimensions of the VDACC object 122. Then place slide contents back into the VDACC object 124 and the process is done.

This means the image is resized to fit into a small VDACC object which appears in the Slide Show VDACC object.

Referring again to does slide contain a text object? 118, if yes, then resize text object so that it has the appearance of 12 point 120. Then place slide contents back into the VDACC object 124 and the process is done.

Text is resized to have the appearance of 12 point so that text objects of any size can be read inside the small VDACC objects in the Slide Show VDACC object. For instance, let's say that a user typed a text object using 48 point Times New Roman. If a font of this size were to be shown inside a small VDACC object that is approximately an inch square, this text could not be read. Even if the text were skewed to fit into the small VDACC object, it would not likely be easily readable. The solution is to have the text rescaled to 12 point text which will easily fit into a one inch square VDACC object and be readable.

Referring back to is slide currently in PR? 116, if no, then is slide currently full screen 116. If no, then process is done. If yes, then the process proceeds to block 118, as described above.

Figure 21:
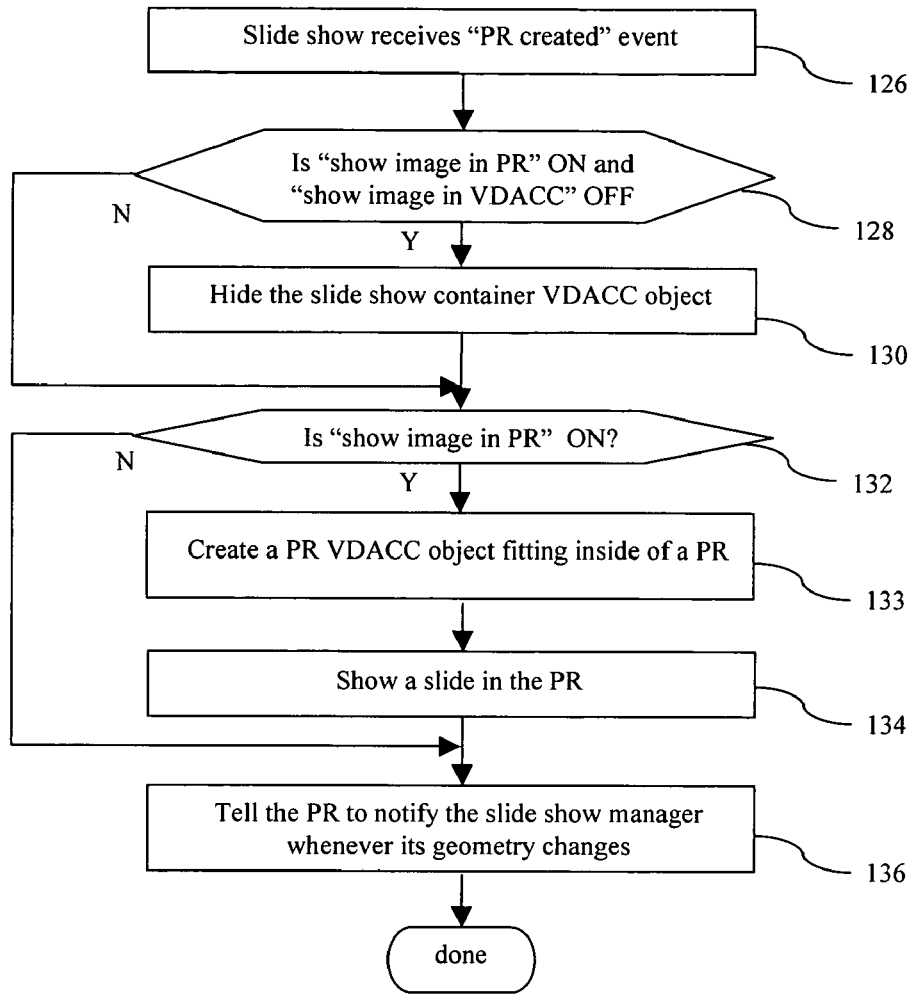
FIG. 21 is a flow chart for using a Play Rectangle.

Turning now to FIG. 21, a flow chart for using a Play Rectangle is shown. The user can create a Play Rectangle for use with the slide show. This is done by creating a switch and labeling it "PR". This causes the Dyomation manager to log the switch as one it is interested in.

The Dyomation manager keeps a list of timelines and switches which are related to Dyomation sessions. If a user types PR on a switch, the Dyomation manager recognizes "PR" as something whose functionality it knows about. The Dyomation manager will then store the existence of this switch in its own internal list. Then the user would press this PR switch—this event is intercepted by the Dyomation manager.

When the user turns on the PR switch, a message is sent out to the Dyomation manager (amongst others) to say that the switch has been pressed. The Dyomation manager acknowledges the existence of this switch.

The Dyomation manager requests the GUI software to create a Play Rectangle (a rectangular timeline). When the PR is created the Dyomation manager logs the association between the PR and the switch. In future, each time the switch is pressed, the Dyomation manager causes the PR to be shown or hidden.

When a PR is created, this event is intercepted by the slide show object, which follows this procedure. This slide show object is the slide show manager software object.

Slide show receives "PR created" event 126.

Then, is "show image in PR" ON 128 and "show image in VDACC" OFF? 128

If yes, then hide the Slide Show container VDACC object 130.

Then is "show image in PR" ON 132?

If no, then tell the PR to notify the slide show manager whenever its geometry changes 136 and the process is done. This means that if the slide show has one of its objects in the Play Rectangle (PR) and the dimensions of the PR are changed, then the slide show resizes the object to what it's just been told the new size is. The resizing of the Play Rectangle would be accomplished by a user clicking on the resize button of the Play Rectangle and dragging any direction.

If yes, then create a PR VDACC object fitting inside the PR 133 and show a slide in the PR 134, as described above with respect the flow diagram of FIG. 19.

Figure 22:
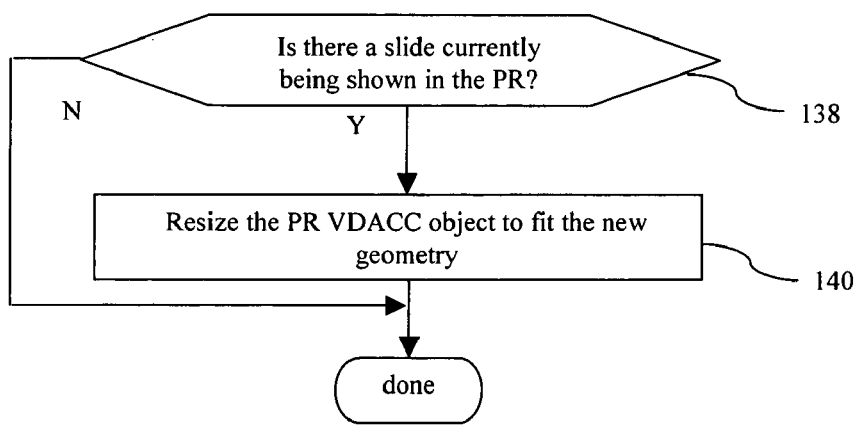
FIG. 22 is a flow chart for changing a Play Rectangle geometry.

Turning now to FIG. 22, a flow chart for changing the Play Rectangle geometry is shown. When the slide show receives notification from a PR that its geometry has changed . . . .

Is there a slide currently being shown in the PR? 138.

If yes, then resize the PR VDACC object to fit the new geometry 140 and the process is done.

If no, then abort the process.

If a slide show is playing back in a Play Rectangle (PR) and the PR is resized or moved onscreen, then every slide in the slide show from this moment forward is resized and appears in the new location to which the PR was moved.

Whenever the Play Rectangle's geometry changes, which includes being moved, it tells the slide show manager and the slide show manager will then cause the PR VDACC object of the Play Rectangle to also move and resize. Every time an event happens which causes a slide to be put into the Play Rectangle then it looks at the current PR VDACC object dimensions and makes that the size for the image or whatever is playing back at that time in the slide show. Every time an event happens which causes the slide show to place an image into a Play Rectangle, then the slide show manager asks the Play Rectangle how big it is and resizes the image accordingly. The Play Rectangle notifies the slide show object whenever its geometry changes.

In accordance with another embodiment of the invention, as shown in FIG. 23, a Play Rectangle (PR) 142 includes a VDACC object 144 that is automatically created when the PR is made to appear onscreen. This PR VDACC object 144 fits just inside the rectangular border 146 or "gray bar" of the PR 142. The PR VDACC object 144 has its outline hidden so that it is not an intrusive graphic component. In addition, the PR VDACC object 144 has its dimensions adjusted automatically to follow any dimensional changes that occur on the PR 142. If the PR is moved or resized, either automatically or by the user, then the PR VDACC object 144 is adjusted to match this change. The PR VDACC object 144 is set to "rescale" mode so that any change to the dimensions of the PR VDACC object 144 will rescale the contents of the PR VDACC object, which are the slide contents that are being played in the PR 142 for a slide show. Thus, the PR 142 is configured to include all the features of a VDACC object that has been set to these conditions.

In this embodiment, the process for playing a slide show in the PR 142 involves sequentially displaying selected slides in the PR VDACC object 144. If the slide show options are set to use the PR 142, then when the "show slide" message is received from the Dyomation manager, the contents of a current slide to be displayed are removed from its small VDACC object in the Slide Show VDACC object, which are shown, for example, in FIG. 2, and resized to fit the PR VDACC object 144. The contents are then placed into the PR VDACC object 144. When a "hide slide" message is received from the Dyomation manager, the contents of the PR 142 (i.e., in the PR VDACC object 144) are rescaled back and placed back into the respective small VDACC object in the Slide Show VDACC object. These steps are repeated for each slide in the slide show being played.

The advantage of using the PR VDACC object 144 contained in the PR 142 is that all the tools of the Blackspace environment can be used to customized the contents of a slide while the slide is displayed in the PR. Since the slide that is currently being displayed in the PR 142 is placed in the PR VDACC object 144, the contents of that slide can be modified as easily as contents in any VDACC object. In addition, since Dyomation data for a slide show involves only the overall slides and not for any of the contents of the slides, the contents of the slides can freely be altered without affecting the playback of the slide show.

Figure 24A:
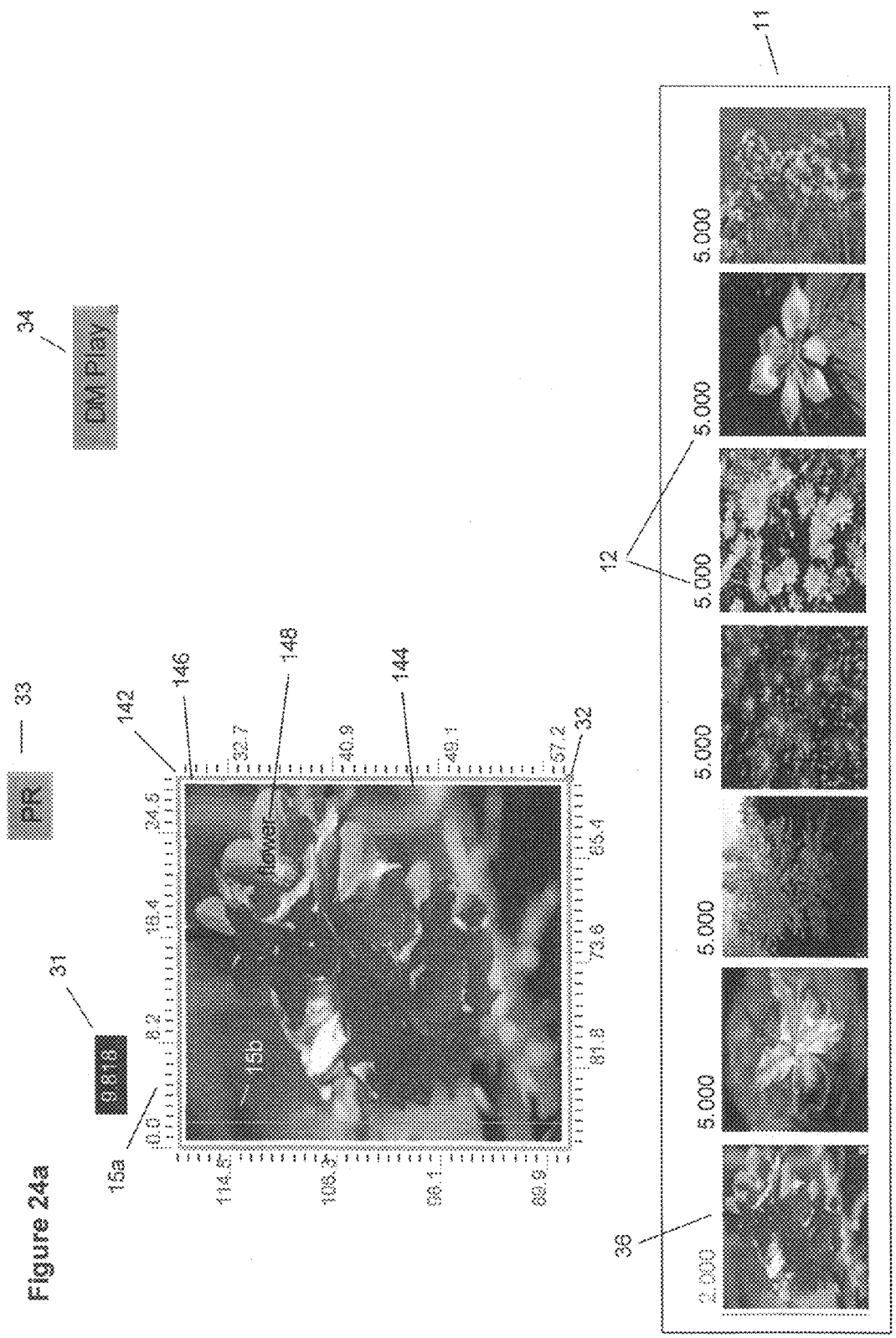
FIG. 24a illustrates typing of text onto a picture of a slide displayed in the Play Rectangle of FIG. 23 to add the text to the slide.

As an example, a user may want to include some text along with a slide containing a picture. With the PR VDACC object 144 in the PR 142, any text can easily be added to the picture displayed in the PR. As illustrated in FIG. 24a, text 148 may be added to a picture that is currently being displayed in the PR 142 by simply typing the text on the picture in the PR VDACC object 144 of the PR. Alternatively, as illustrated in FIG. 24b, the text 148 may be added to the picture displayed in the PR 142 by dragging the text from the Blackspace global drawing surface into the PR VDACC object 144 and then releasing that text over the picture displayed in the PR 142.

The contents of VDACC objects, including the PR VDACC object 144, are manipulated in the Blackspace environment by processing "collisions" between objects in the Blackspace global drawing surface. As used herein, a colliding object means the object being moved and being "dropped" onto another object. "Dropped" means moved with a mouse (or by another software process) and then let go to land in a new position in the Blackspace environment. Alternatively, a colliding object may be the object being entered over another object, e.g., text being typed over an object. In addition, a collision target means an object onto which some other object is being "dropped".

Any object that is placed in a VDACC object collides with the VDACC object and becomes under control of that VDACC object. To a user, any object that is placed in a VDACC object becomes automatically clipped or agglomerated to the workspace canvas of the VDACC object along with other objects that may already be in the VDACC object. Thus, the contents of a VDACC object can be changed by removing objects from or adding objects to the VDACC object.

However, in some instances, a user may want to record a Dyomation session during which one or more objects are placed over the slide being displayed in a PR without adding the objects to the PR VDACC object 144, and thus, modifying the contents of the slide. As an example, a user may want to show the typing of text, character by character by recording the typing in a Dyomation session. In such a case, the new objects (text characters) being placed into the VDACC object of the PR must be prevented from becoming part of the slide data or "agglomerating" into the slide. Thus, the PR VDACC object 144 of the PR 142 includes a setting to deactivate the "auto-agglomerate" feature of the PR VDACC object. This setting may be included in the Info Canvas object of a DM switch for a user to select. When this feature is deactivated, then collisions with slide show objects displayed in the PR 144 are rejected and the colliding object is not placed into any small VDACC object of the Slide Show VDACC object.

Figure 25:
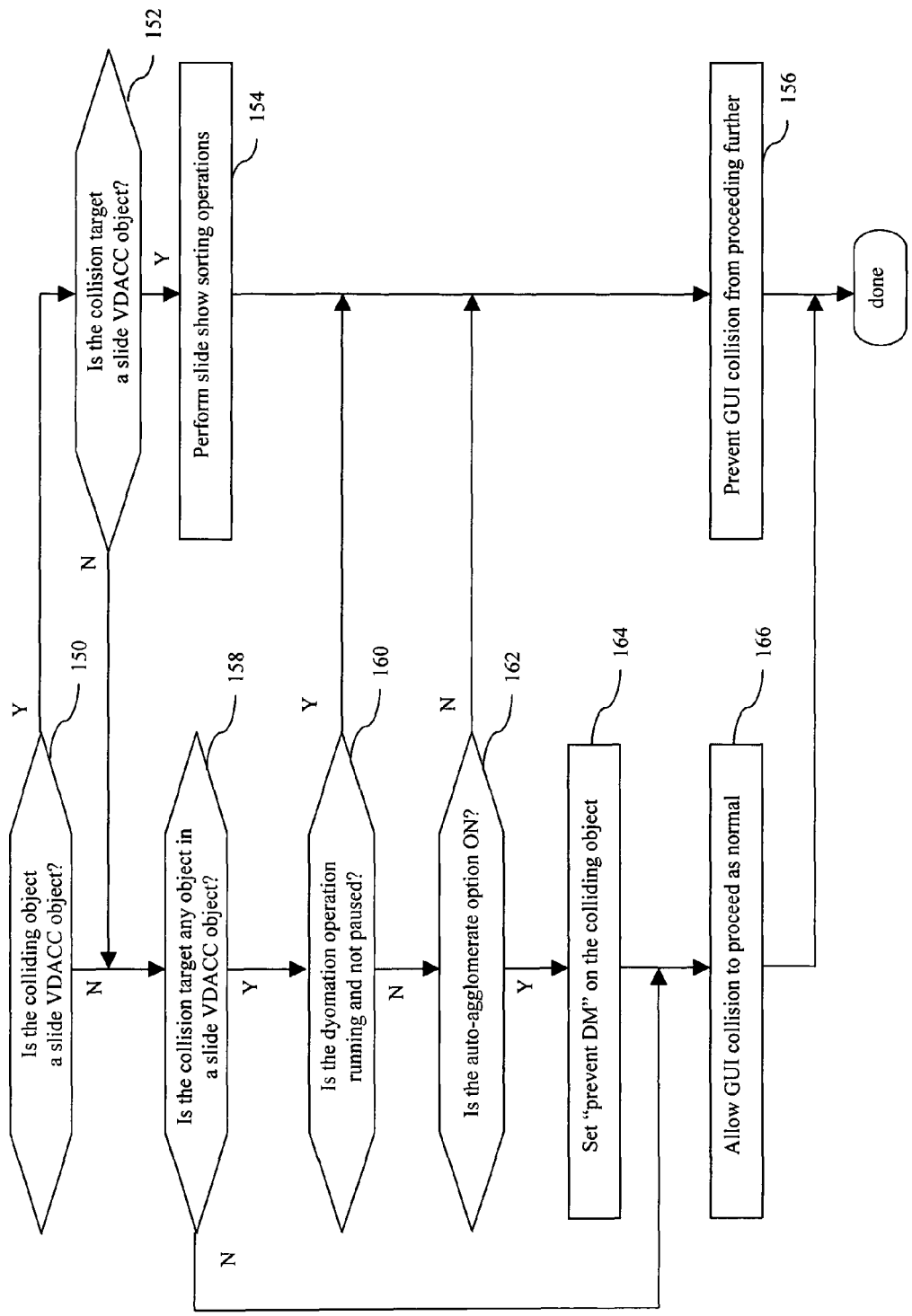
FIG. 25 is a flow chart for handling collisions between objects in accordance with an embodiment of the invention.

Turning now to FIG. 25, a flow chart of a process for handing collisions between objects in reference to a slide show is shown. At block 150, a determination is made whether the colliding object is a slide VDACC object, a small VDACC object in a Slide Show VDACC object. If so, then another determination is made whether the collision target is also a slide VDACC object, at block 152. If so, then slide show sorting operations are performed, at block 154. The slide show sorting operations have already been described above (paragraph [0059] and FIG. 7). Then, at block 156, GUI collision is prevented from proceeding further and the process comes to an end.

If the colliding object is not a slide VDACC object or if the collision target is not a slide VDACC object, then a determination is made whether the collision target is any object in a slide VDACC object, at block 158. If no, then the process proceeds to block 166, where GUI collision is allowed to proceed as normal and the process comes to an end. That is, the colliding object is added to the PR VDACC object to become a part of the slide being displayed in the PR VDACC object of the PR. However, if the collision target is an object in a slide VDACC object, then the process proceeds to block 160, where a determination is made whether the Dyomation operation is running and not paused.

If so, then the process proceeds to block 156. However, if no, another determination is made whether the auto-agglomerate setting is ON, at block 162. If no, then the process proceeds to block 156. If so, the "prevent DM" is set on the colliding object and the process proceeds to block 166.

Figure 26:
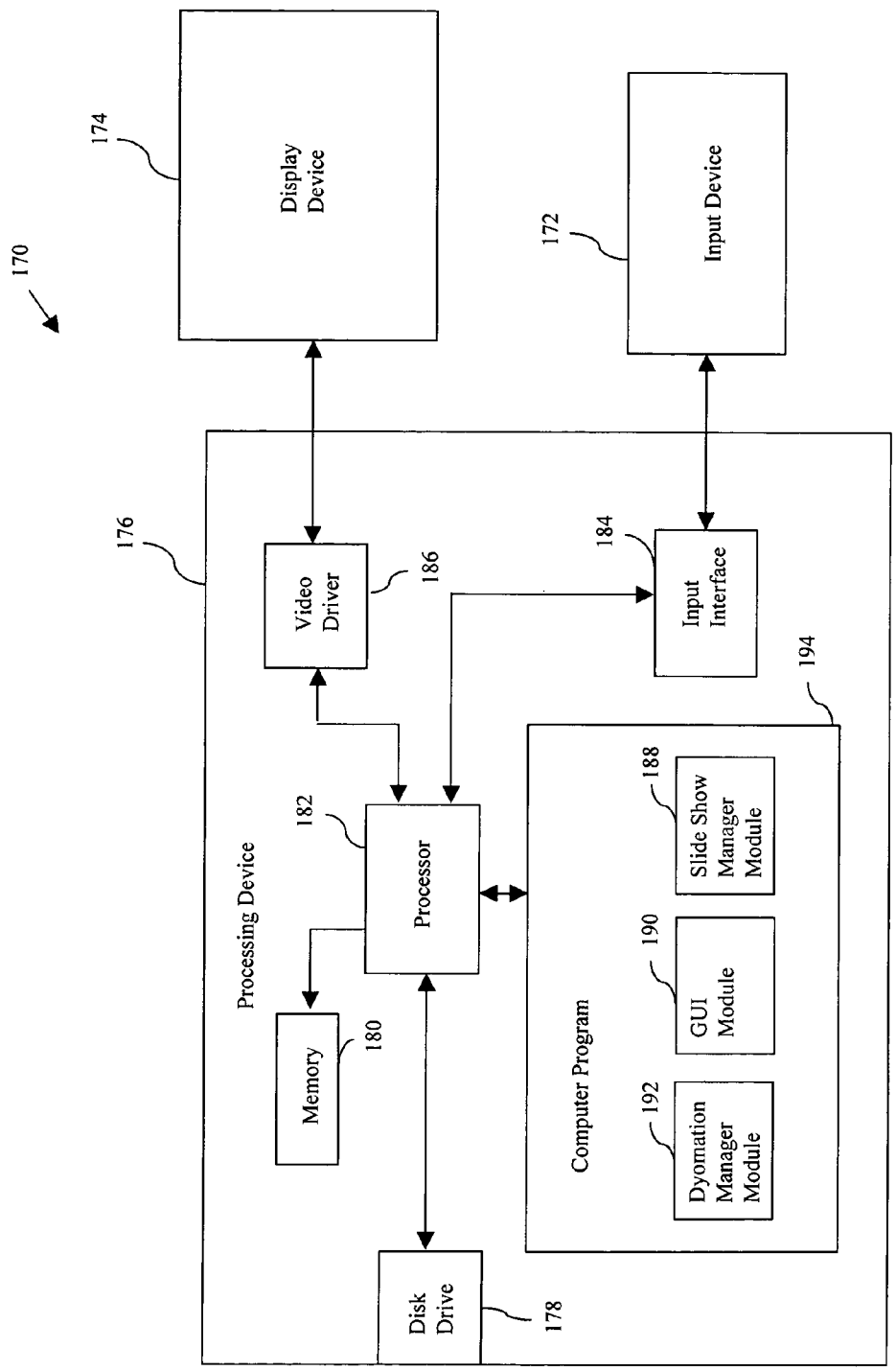
FIG. 26 is a block diagram of a computer system for creating, playing and modifying slides shows in accordance with an embodiment of the invention.

Turning now to FIG. 26, a computer system 170 in which a method for modifying a slide show in accordance with an embodiment of the invention has been implemented is shown. The computer system 170 may be a personal computer, a personal digital assistant (PDA) or any computing system with a display device. In one embodiment, the method may be embodied in a computer readable storage medium, such as a CD, that includes instructions, which can be executed by the computer system 170, to implement the method in the system.

As illustrated in FIG. 26, the computer system 170 includes an input device 172, a display device 174 and a processing device 176. Although these devices are shown as separate devices, two or more of these devices may be integrated together. The input device 172 allows a user to input commands into the system 170, for example, to enter numeric and/or textual characters into a slide displayed in a PR or to drag one or more graphic objects into that slide. The input device 172 may include a computer keyboard and a mouse. However, the input device 172 may be any type of electronic input device, such as buttons, dials, levers and/or switches on the processing device 176. Alternatively, the input device 172 may be part of a touch-sensitive display that allows a user to input commands using a stylus. The display device 174 may be any type of a display device, such as those found in personal computer systems, e.g., CRT monitors or LCD monitors.

The processing device 176 of the computer system 170 includes a disk drive 178, memory 180, a processor 182, an input interface 184, and a video driver 186. The processing device 176 further includes a slide show manager module 188, a GUI module 190 and a Dyomation manager module 192, which performs various tasks related to creating, playing and modifying of slide shows. As shown in FIG. 26, the slide show manager module 188, the GUI module 190 and the Dyomation manager module 192 may be implemented as part of a computer program 194, e.g., a Blackspace program that provides the Blackspace operating environment. In one embodiment, these modules 188-192 are implemented as software. However, the modules 188-192 may be implemented in any combination of hardware, firmware and/or software.

The disk drive 178, the memory 180, the processor 182, the input interface 184 and the video driver 186 are components that are commonly found in personal computers. The disk drive 178 provides a means to input data and to install programs into the system 170 from an external computer readable storage medium. As an example, the disk drive 178 may a CD drive to read data contained therein. The memory 180 is a storage medium to store various data utilized by the computer system 170. The memory 180 may be a hard disk drive, read-only memory (ROM) or other forms of memory. The processor 182 may be any type of digital signal processor that can run the computer program 194, including the slide show manager module 188, the GUI module 190 and the Dyomation manager module 192. The input interface 184 provides an interface between the processing device 176 and the input device 172. The video driver 186 drives the display device 174. In order to simplify the figure, additional components that are commonly found in a processing device of a personal computer system are not shown or described.

Figure 27:
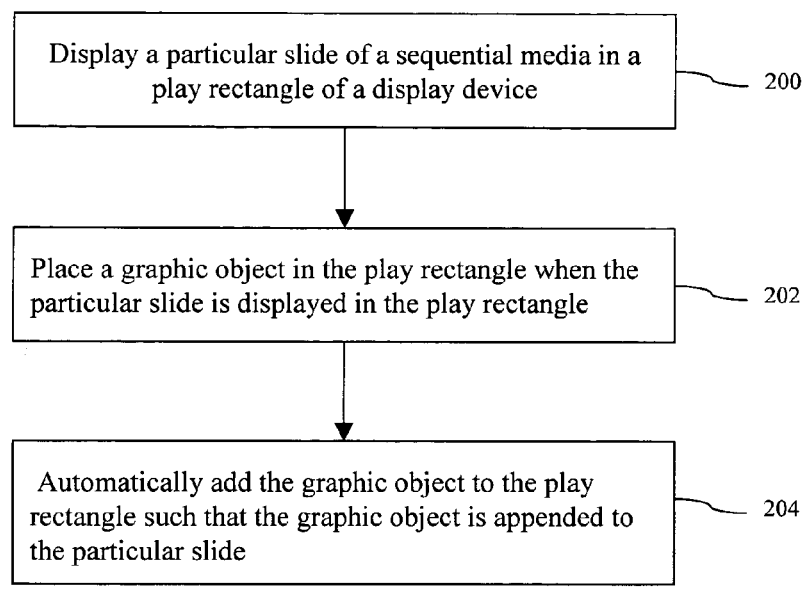
FIG. 27 is a flow diagram of a method for modifying a slide show in accordance with an embodiment of the invention.

A method for modifying a sequential media of slides, e.g., a slide show of images, is described with reference to a flow diagram of FIG. 27. At block 200, a particular slide of the sequential media is displayed in a play rectangle of a display. The play rectangle has an agglomerative property for graphic objects placed in the play rectangle. Next, at block 202, a graphic object is placed in the play rectangle when the particular slide is displayed in the play rectangle. Next, at block 204, the graphic object is automatically added to the play rectangle such that the graphic object is appended to the particular slide for subsequent sequential display of the slides in the play rectangle, including the particular slide with the graphic object.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for modifying a sequential media of slides, said method comprising:
   providing graphic elements that represent slides in a computer operating environment displayed on a display device;
   drawing a graphical directional indicator that intersects some of said graphic elements and points to a global drawing surface of said computer operating environment in response to user input to select some of said graphic elements to create said sequential media;
   activating a logic associated with said graphical directional indicator to create said sequential media;
   collectively displaying slides of said selected graphic elements in a slide display area in said display device in response to said logic being activated; and;
   displaying a play area in said display device along with said slide display area in which said slides are sequentially displayed when said sequential media is played in response to said logic being activated.

2. The method of claim 1 further comprising:
   placing a graphic object in said play area when a particular slide of said sequential media is displayed in said play area in response to user input; and
   automatically adding said graphic object to said play area such that said graphic object is appended to said particular slide for subsequent sequential display of said slides in said play area, including said particular slide with said graphic object.

3. The method of claim 2 wherein said slide display area includes a first play cursor that moves through said slides displayed in said slide display area when said sequential media is played, wherein said play area has an agglomerative property for graphic objects placed in said play area, and wherein said play area including a second play cursor that moves along at least most of the entire perimeter of said play area as said slides are sequentially displayed in said plate area.

4. The method of claim 3 wherein said adding of said graphic object is executed only when said agglomerative property of said play area has not been deactivated.

5. The method of claim 2 wherein said placing of said graphic object includes typing text onto said particular slide displayed in said play area.

6. The method of claim 2 wherein said placing of said graphic object includes dragging said graphic object from outside of said play area into said play area.

7. The method of claim 2 wherein said placing of said graphic object includes moving said graphic object from a first location within said play area to a second location within said play area.

8. The method of claim 2 wherein said displaying said slides of said selected graphic elements in said slide display area includes displaying said slides of said selected graphic elements in said slide display area in the order in which said selected graphic elements were selected using said graphical directional indicator.

9. The method of claim 2 further comprising sequentially transferring each of said slides between said slide display area and said play area to sequentially display said slides in said play area.

10. The method of claim 9 wherein said sequentially transferring each of said slides includes transferring said particular slide back to said slide display area with said graphic object appended to said particular slide after said particular slide has been displayed in said play area.

11. The method of claim 10 wherein said sequentially transferring each of said slides includes transferring said particular slide with said graphic object appended to said particular slide from said slide display area to said play area to display said particular slide with said graphic object in said play area.

12. A system which includes a processor and memory for modifying a sequential media of slides, said system comprising:
   a slide display area displayed in a computer operating environment displayed on a display device, said slide display area being used to collectively display said slides of said sequential media;
   a play area displayed in said computer operating environment displayed on said display device along with said slide display area, said play area being used to sequentially display said slides when said sequential media is played;
   a media manager module configured to provide said slides in said slide display area when a graphical directional indicator that intersect one or more graphic elements that represent said slides and points to a global drawing surface of said computer operating environment in response to user input and a logic associated with said graphical directional indicator is activated to create said sequential media, said media manager module being further configured to display said slide display area and said play area in response to said logic being activated.

13. The system of claim 12 wherein said media manager module is further configured to place a graphic object in said play area when a particular slide of said sequential media is displayed in said play area in response to user input, said media manager module being further configured to automatically add said graphic object to said play area such that said graphic object is appended to said particular slide for subsequent sequential display of said slides in said play area, including said particular slide with said graphic object.

14. The system of claim 13 wherein said slide display area includes a first play cursor that moves through said slides displayed in said slide display area when said sequential media is played, wherein said play area has an agglomerative property for graphic objects placed in said play area, and wherein said play area including a second play cursor that moves along at least most of the entire perimeter of said play area as said slides are sequentially displayed in said play area.

15. The system of claim 13 wherein said play area is configured to automatically add text to said play area and append said text to said particular slide when said text is typed onto said particular slide displayed in said slide display area.

16. The system of claim 13 wherein said play area is configured to automatically add said graphic object to said play area and append said graphic object when said graphic object is dragged from outside of said play area into said play area.

17. The system of claim 13 wherein said play area is configured to allow said graphic object appended to said particular to be moved from a first location within said play area to a second location within said play area.

18. The system of claim 13 wherein said media manager module is configured to provide said slides of said selected graphic elements to said slide display area in the order in which said selected graphic elements were selected using said graphical directional indicator.

19. The system of claim 13 wherein said media manager module is configured to sequentially transfer each of said slides between said slide display area and said play area to sequentially display said slides in said play area.

20. The system of claim 19 wherein said media manager module is configured to transfer said particular slide back to said slide display area with said graphic object appended to said particular slide after said particular slide has been displayed in said play area.

21. The system of claim 19 wherein said media manager module is configured to transfer said particular slide with said graphic object appended to said particular slide from said slide display area to said play area to display said particular slide with said graphic object in said play area.

22. A storage medium readable by a computer, tangibly embodying a program of instructions executable by said computer to perform method steps for modifying a sequential media of slides, said method steps comprising:
   providing graphic elements that represent slides in a computer operating environment displayed on a display device;
   drawing a graphical directional indicator that intersects some of said graphic elements and points to a global drawing surface of said computer operating environment in response to user input to select some of said graphic elements to create said sequential media;
   activating a logic associated with said graphical directional indicator to create said sequential media;
   collectively displaying slides of said selected graphic elements in a slide display area in said display device in response to said logic being activated; and
   displaying a play area in said display device along with said slide display area in which said slides are sequentially displayed when said sequential media is played in response to said logic being activated.

23. The storage medium of claim 22 wherein the method steps further comprises:
   placing a graphic object in said play area when a particular slide of said sequential media is displayed in said play area in response to user input; and
   automatically adding said graphic object to said play area such that said graphic object is appended to said particular slide for subsequent sequential display of said slides in said play area, including said particular slide with said graphic object.

24. The storage medium of claim 23 wherein said slide display area includes a first play cursor that moves through said slides displayed in said slide display area when said sequential media is played, wherein said play area has an agglomerative property for graphic objects placed in said play area, and wherein said play area including a second play cursor that moves along at least most of the entire perimeter of said play area as said slides are sequentially displayed in said play area.

25. The storage medium of claim 24 wherein said adding of said graphic object is executed only when said agglomerative property of said play area has not been deactivated.

26. The storage medium of claim 23 wherein said placing of said graphic object includes typing text onto said particular slide displayed in said play area.

27. The storage medium of claim 23 wherein said placing of said graphic object includes dragging said graphic object from outside of said play area into said play area.

28. The storage medium of claim 23 wherein said placing of said graphic object includes moving said graphic object from a first location within said play area to a second location within said play area.

29. The storage medium of claim 23 wherein said displaying said slides of said selected graphic elements in said slide display area includes displaying said slides of said selected graphic elements in said slide display area in the order in which said selected graphic elements were selected using said graphical directional indicator.

30. The storage medium of claim 23 further comprising sequentially transferring each of said slides between said slide display area and said play area to sequentially display said slides in said play area.

31. The storage medium of claim 30 wherein said sequentially transferring each of said slides includes transferring said particular slide back to said slide display area with said graphic object appended to said particular slide after said particular slide has been displayed in said play area.

32. The storage medium of claim 31 wherein said sequentially transferring each of said slides includes transferring said particular slide with said graphic object appended to said particular slide from said slide display area to said play area to display said particular slide with said graphic object in said play area.

* * * * *